US012773966B2

(12) United States Patent
Awtar et al.

(10) Patent No.: US 12,773,966 B2
(45) Date of Patent: Oct. 27, 2026

(54) PASSENGER STATE MODULATION SYSTEM FOR PASSENGER VEHICLES BASED ON PREDICTION AND PREEMPTIVE CONTROL

(71) Applicant: THE REGENTS OF THE UNIVERSITY OF MICHIGAN, Ann Arbor, MI (US)

(72) Inventors: Shorya Awtar, Ann Arbor, MI (US); Nishant M. Jalgaonkar, Ann Arbor, MI (US); Daniel Sousa Schulman, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1362 days.

(21) Appl. No.: 17/072,802

(22) Filed: Oct. 16, 2020

(65) Prior Publication Data

US 2021/0114553 A1 Apr. 22, 2021

Related U.S. Application Data

(60) Provisional application No. 62/916,406, filed on Oct. 17, 2019.

(51) Int. Cl.
*B60R 22/48* (2006.01)
*B60K 35/10* (2024.01)
(Continued)

(52) U.S. Cl.
CPC .............. *B60R 22/48* (2013.01); *B60K 35/10* (2024.01); *B60K 35/22* (2024.01); *B60K 35/53* (2024.01);
(Continued)

(58) Field of Classification Search
CPC . B60R 22/48; B60R 22/04; B60R 2022/4808; B60R 2022/4866; G06N 20/00; G01C 21/3626; G01C 21/3691
See application file for complete search history.

(56) References Cited

U.S. PATENT DOCUMENTS 5,647,835 A 7/1997 Martineau
6,932,090 B1 8/2005 Reschke et al.
(Continued)

FOREIGN PATENT DOCUMENTS

CN 109263518 A 1/2019
CN 110155072 A 8/2019
(Continued)

OTHER PUBLICATIONS

Wada, T., Konno, H., Fujisawa, S., & Doi, S. (2012). Can Passengers' Active Head Tilt Decrease the Severity of Carsickness?: Effect of Head Tilt on Severity of Motion Sickness in a Lateral Acceleration Environment. Human Factors: The Journal of the Human Factors and Ergonomics Society, 54(2), 226-234.
(Continued)

*Primary Examiner* — Aryan E Weisenfeld
(74) *Attorney, Agent, or Firm* — Reising Ethington P.C.

(57) ABSTRACT

A passenger state modulation system for passenger vehicles is presented. The passenger state modulation system operates to predict events that will impact the passengers state (e.g., motion sickness) before they happen and use the prediction to implement preemptive interventions with active vehicle sub-systems.

29 Claims, 10 Drawing Sheets

(51) Int. Cl.

| | |
|---|---|
| ***B60K 35/22*** | (2024.01) |
| ***B60K 35/53*** | (2024.01) |
| ***B60N 2/02*** | (2006.01) |
| ***B60R 22/04*** | (2006.01) |
| ***G01C 21/36*** | (2006.01) |
| ***G06N 20/00*** | (2019.01) |

(52) U.S. Cl.

CPC ............ *B60N 2/0244* (2013.01); *B60R 22/04* (2013.01); *G01C 21/3626* (2013.01); *G01C 21/3691* (2013.01); *G06N 20/00* (2019.01); *B60K 2360/149* (2024.01); *B60N 2220/20* (2023.08); *B60R 2022/4808* (2013.01); *B60R 2022/4866* (2013.01)

(56) References Cited

U.S. PATENT DOCUMENTS

| | | | |
|---|---|---|---|
| 7,722,526 | B2 | 5/2010 | Kim |
| 7,974,748 | B2 | 7/2011 | Goerick et al. |
| 7,982,620 | B2 | 7/2011 | Prokhorov et al. |
| 8,022,831 | B1 | 9/2011 | Wood-Eyre |
| 8,401,758 | B2 | 3/2013 | Stahlin et al. |
| 8,532,879 | B2 | 9/2013 | Sanma et al. |
| 8,547,215 | B2 | 10/2013 | Sanma et al. |
| 8,631,893 | B2 | 1/2014 | Van Schoiack |
| 8,786,421 | B2 | 7/2014 | Dozza |
| 9,145,129 | B2 | 9/2015 | Worrel et al. |
| 9,308,914 | B1 | 4/2016 | Sun et al. |
| 9,349,263 | B2 | 5/2016 | Kiefer et al. |
| 9,358,925 | B2 | 6/2016 | Kariatsumari et al. |
| 9,493,118 | B1 | 11/2016 | Laur et al. |
| 9,511,730 | B1 | 12/2016 | Wu |
| 9,517,777 | B2 | 12/2016 | Hall et al. |
| 9,520,061 | B2 | 12/2016 | Cech et al. |
| 9,573,601 | B2 | 2/2017 | Hoye et al. |
| 9,650,057 | B2 | 5/2017 | Langenhan |
| 9,725,036 | B1 | 8/2017 | Tarte |
| 9,771,082 | B2 | 9/2017 | Farrell et al. |
| 9,776,644 | B2 | 10/2017 | Chun et al. |
| 9,789,880 | B2 | 10/2017 | Sweeney et al. |
| 9,862,312 | B2 | 1/2018 | Sivak et al. |
| 9,868,332 | B2 | 1/2018 | Anderson et al. |
| 9,878,583 | B2 | 1/2018 | Enomoto et al. |
| 9,956,963 | B2 | 5/2018 | Vijaya Kumar et al. |
| 9,969,406 | B2 | 5/2018 | Shirakata et al. |
| 10,000,103 | B2 | 6/2018 | Hrovat et al. |
| 10,078,338 | B2 | 9/2018 | Smartt et al. |
| 10,093,323 | B2 | 10/2018 | Kelly et al. |
| 10,099,613 | B2 | 10/2018 | Badger, II |
| 10,107,635 | B2 | 10/2018 | Larner et al. |
| 10,173,696 | B2 | 1/2019 | Yamaguchi |
| 10,210,409 | B1 | 2/2019 | Migneco et al. |
| 10,259,451 | B2 | 4/2019 | Wan et al. |
| 10,293,718 | B1 | 5/2019 | Ilievski et al. |
| 10,300,929 | B2 | 5/2019 | Nagy et al. |
| 10,303,961 | B1 | 5/2019 | Stoffel et al. |
| 10,372,130 | B1 | 8/2019 | Kaushansky et al. |
| 10,377,275 | B2 | 8/2019 | Ketels et al. |
| 10,410,525 | B2 | 9/2019 | Mohra et al. |
| 10,507,829 | B2 | 12/2019 | Newman et al. |
| 10,589,751 | B2 | 3/2020 | Nagy et al. |
| 10,625,641 | B2 | 4/2020 | Park |
| 10,643,391 | B2 | 5/2020 | Rober et al. |
| 10,676,086 | B2 | 6/2020 | Fujii et al. |
| 10,703,385 | B2 | 7/2020 | Shannon et al. |
| 10,735,695 | B2 | 8/2020 | Schofield et al. |
| 10,737,053 | B2 | 8/2020 | Ketels et al. |
| 10,793,152 | B2 | 10/2020 | Limbacher |
| 10,867,218 | B2 | 12/2020 | Gallagher et al. |
| 10,870,435 | B2 | 12/2020 | Fujisawa et al. |
| 10,940,872 | B2 | 3/2021 | Alexiou et al. |
| 10,955,847 | B2 | 3/2021 | Hartung et al. |
| 11,038,895 | B2 | 6/2021 | Bartfai-Walcott et al. |
| 11,235,764 | B2 | 2/2022 | Bogner et al. |
| 11,235,929 | B1 | 2/2022 | Brady et al. |
| 11,275,442 | B2 | 3/2022 | Marti et al. |
| 11,281,215 | B2 | 3/2022 | Yoshizaki et al. |
| 11,325,531 | B2 | 5/2022 | Szczerba et al. |
| 11,338,106 | B2 | 5/2022 | Fabry et al. |
| 11,479,149 | B2 | 10/2022 | Kusayanagi et al. |
| 2007/0000709 | A1 | 1/2007 | Danger et al. |
| 2008/0122598 | A1 | 5/2008 | Hamester et al. |
| 2008/0201039 | A1 | 8/2008 | Matsuoka et al. |
| 2010/0198458 | A1 | 8/2010 | Buttolo et al. |
| 2012/0203309 | A1 | 8/2012 | Englehart |
| 2017/0234691 | A1 | 8/2017 | Abramson et al. |
| 2017/0253252 | A1 | 9/2017 | Donnelly et al. |
| 2017/0308083 | A1 | 10/2017 | Sato et al. |
| 2017/0313326 | A1 | 11/2017 | Sweeney et al. |
| 2017/0327082 | A1 | 11/2017 | Kamhi et al. |
| 2018/0089901 | A1 | 3/2018 | Rober et al. |
| 2018/0093675 | A1 | 4/2018 | Holub et al. |
| 2018/0141568 | A1 | 5/2018 | Singhal et al. |
| 2018/0217601 | A1 | 8/2018 | Marcoux et al. |
| 2019/0022347 | A1 | 1/2019 | Wan et al. |
| 2019/0061655 | A1 | 2/2019 | Son |
| 2020/0082638 | A1 | 3/2020 | Rober et al. |
| 2020/0216078 | A1 | 7/2020 | Katz |
| 2020/0218263 | A1 | 7/2020 | Amir et al. |
| 2020/0231182 | A1 | 7/2020 | Oba |
| 2020/0317089 | A1 | 10/2020 | Friedrich |
| 2021/0103743 | A1 | 4/2021 | Park |
| 2021/0114553 | A1 | 4/2021 | Awtar et al. |
| 2021/0213970 | A1 | 7/2021 | Almedia et al. |
| 2021/0240190 | A1 | 8/2021 | Wray et al. |
| 2021/0269045 | A1 | 9/2021 | Katz et al. |
| 2021/0380021 | A1 | 12/2021 | Fu et al. |
| 2022/0001773 | A1 | 1/2022 | Bohrmann |
| 2022/0410710 | A1 | 12/2022 | Alalao |

FOREIGN PATENT DOCUMENTS

| | | | |
|---|---|---|---|
| CN | 113753059 | A | 12/2021 |
| CN | 109753058 | B | 8/2022 |
| DE | 102008064022 | A1 | 9/2009 |
| DE | 102009031676 | A1 | 1/2011 |
| DE | 102014221337 | A1 | 4/2015 |
| DE | 102014006728 | A1 | 11/2015 |
| DE | 102015216403 | A1 | 3/2017 |
| DE | 102004034748 | B4 | 3/2018 |
| DE | 102017206435 | A1 | 10/2018 |
| DE | 102017211463 | A1 | 1/2019 |
| DE | 102017215641 | A1 | 3/2019 |
| DE | 102017223609 | A1 | 6/2019 |
| DE | 102018002564 | A1 | 10/2019 |
| DE | 102018217697 | A1 | 4/2020 |
| EP | 2314490 | A1 | 4/2011 |
| EP | 2431218 | A1 | 3/2012 |
| EP | 3860895 | A1 | 8/2021 |
| GB | 2567854 | A | 5/2019 |
| GB | 2567856 | A | 5/2019 |
| JP | 2007236644 | A | 9/2007 |
| JP | 2009277145 | A | 11/2009 |
| JP | 2011079363 | A | 4/2011 |
| JP | 2011183845 | A | 9/2011 |
| JP | 5182353 | B2 | 4/2013 |
| JP | 2017071370 | A | 4/2017 |
| JP | 2018524223 | A | 8/2018 |
| JP | 6439647 | B2 | 12/2018 |
| KR | 10-2015-0045164 | A | 4/2015 |
| KR | 20150045164 | A | 4/2015 |
| KR | 10-2017-0064909 | A | 6/2017 |
| KR | 20170064909 | A | 6/2017 |
| KR | 10-2018-0125810 | A | 11/2018 |
| KR | 20190029182 | A | 3/2019 |
| KR | 101997275 | B1 | 10/2019 |
| KR | 102347753 | B1 | 1/2022 |
| WO | WO2017195200 | A2 | 11/2017 |
| WO | WO2019199880 | A1 | 10/2019 |
| WO | WO2020010822 | A1 | 1/2020 |

(56) References Cited

FOREIGN PATENT DOCUMENTS

| | | |
|---|---|---|
| WO | WO2020176770 A1 | 9/2020 |
| WO | WO2021037654 A1 | 3/2021 |

OTHER PUBLICATIONS

Li, D., & Chen, L. (2022). Mitigating motion sickness in automated vehicles with vibration cue system. Ergonomics, 65 (10), 1313-1325.
Kuiper, O. X., Bos, J. E., Diels, C., & Schmidt, E. A. (2020). Knowing what's coming: Anticipatory audio cues can mitigate motion sickness. Applied Ergonomics, 85, 103068.
Karjanto, J., MD. Yusof, N., Wang, C., Terken, J., Delbressine, F., & Rauterberg, M. (2018). The effect of peripheral visual feedforward system in enhancing situation awareness and mitigating motion sickness in fully automated driving. Transportation Research Part F: Traffic Psychology and Behaviour, 58, 678-692.
De Winkel, K. N., Pretto, P., Nooij, S. A. E., Cohen, I., & Bülthoff, H. H. (2021). Efficacy of augmented visual environments for reducing sickness in autonomous vehicles. Applied Ergonomics, 90, 103282.
MD Yusof, N., Karjanto, J., Terken, J., Delbressine, F., & Rauterberg, M. (2020). Gaining Situation Awareness through a Vibrotactile Display to Mitigate Motion Sickness in Fully-Automated Driving Cars. International Journal of Automotive and Mechanical Engineering, 17, 7771-7783.
Gálvez-García, G., Hay, M., & Gabaude, C. (2015). Alleviating Simulator Sickness with Galvanic Cutaneous Stimulation. Human Factors, 57(4), 649-657.
Hainich, R., Drewitz, U., Ihme, K., Lauermann, J., Niedling, M., & Oehl, M. (2021). Evaluation of a Human-Machine Interface for Motion Sickness Mitigation Utilizing Anticipatory Ambient Light Cues in a Realistic Automated Driving Setting. Information, 12(4), Article 4.
Lin, J. J.-W., Parker, D. E., Lahav, M., & Furness, T. A. (2005). Unobtrusive vehicle motion prediction cues reduced simulator sickness during passive travel in a driving simulator. Ergonomics, 48(6), 608-624.
Gálvez-García, G., Albayay, J., Rehbein, L., & Tornay, F. (2017). Mitigating Simulator Adaptation Syndrome by means of tactile stimulation. Applied Ergonomics, 58, 13-17.
Maculewicz, J., Larsson, P., & Fagerlönn, J. (2021). Intuitive and subtle motion-anticipatory auditory cues reduce motion sickness in self-driving cars. Int. J. Human Factors and Ergonomics, 8(4).
Guo, Y., Sun, Q., Su, Y., Guo, Y., & Wang, C. (2021). Can driving condition prompt systems improve passenger comfort of intelligent vehicles? A driving simulator study. Transportation Research Part F: Traffic Psychology and Behaviour, 81, 240-250.
Sawabe, T., Kanbara, M., & Hagita, N. (2017). Diminished reality for acceleration stimulus: Motion sickness reduction with vection for autonomous driving. 2017 IEEE Virtual Reality (VR), 277-278.
Bohrmann, D., Bruder, A., & Bengler, K. (2022). Effects of Dynamic Visual Stimuli on the Development of Carsickness in Real Driving. IEEE Transactions on Intelligent Transportation Systems, 23(5), 4833-4842.
Keshavarz, B., Stelzmann, D., Paillard, A., & Hecht, H. (2015). Visually induced motion sickness can be alleviated by pleasant odors. Experimental Brain Research, 233(5), 1353-1364.
Keshavarz, B., & Hecht, H. (2014). Pleasant music as a countermeasure against visually induced motion sickness. Applied Ergonomics, 45(3), 521-527.
Meschtscherjakov, A., Strumegger, S., & Trösterer, S. (2019). Bubble Margin: Motion Sickness Prevention While Reading on Smartphones in Vehicles. In D. Lamas, F. Loizides, L. Nacke, H. Petrie, M. Winckler, & P. Zaphiris (Eds.), Human-Computer Interaction—INTERACT 2019 (pp. 660-677). Springer International Publishing.
Miksch, M., Steiner, M., Miksch, M., & Meschtscherjakov, A. (2016). Motion Sickness Prevention System (MSPS): Reading Between the Lines. Adjunct Proceedings of the 8th International Conference on Automotive User Interfaces and Interactive Vehicular Applications, 147-152.
Meschtscherjakov, A., Döttlinger, C., Rödel, C., & Tscheligi, M. (2015). ChaseLight: Ambient LED stripes to control driving speed. Proceedings of the 7th International Conference on Automotive User Interfaces and Interactive Vehicular Applications, 212-219.
Hanau, E., & Popescu, V. (2017). MotionReader: Visual Acceleration Cues for Alleviating Passenger E-Reader Motion Sickness. Proceedings of the 9th International Conference on Automotive User Interfaces and Interactive Vehicular Applications Adjunct, 72-76.
Hock, P., Benedikter, S., Gugenheimer, J., & Rukzio, E. (2017). CarVR: Enabling In-Car Virtual Reality Entertainment. Proceedings of the 2017 CHI Conference on Human Factors in Computing Systems, 4034-4044.
Mcgill, M., Ng, A., & Brewster, S. (2017). I Am The Passenger: How Visual Motion Cues Can Influence Sickness For In-Car VR. Proceedings of the 2017 CHI Conference on Human Factors in Computing Systems, 5655- 5668.
Qiu, Z., Mcgill, M., Pöhlmann, K. M. T., & Brewster, S. A. (2022). Display Rotation for Reducing Motion Sickness Caused by Using VR in Vehicles. Adjunct Proceedings of the 14th International Conference on Automotive User Interfaces and Interactive Vehicular Applications, 25-29.
Van Veen, T., Karjanto, J., & Terken, J. (2017). Situation Awareness in Automated Vehicles through Proximal Peripheral Light Signals. Proceedings of the 9th International Conference on Automotive User Interfaces and Interactive Vehicular Applications, 287-292.
Bos, J. E. (2015). Less sickness with more motion and/or mental distraction. Journal of Vestibular Research, 25(1), 23-33.
D'Amour, S., Bos, J. E., & Keshavarz, B. (2017). The efficacy of airflow and seat vibration on reducing visually induced motion sickness. Experimental Brain Research, 235(9), 2811-2820.
Sang, F. D. Y. P., Billar, J. P., Golding, J. F., & Gresty, M. A. (2003). Behavioral Methods of Alleviating Motion Sickness: Effectiveness of Controlled Breathing and a Music Audiotape. Journal of Travel Medicine, 10(2), 108-111.
Dahlman, J., Sjörs, A., Ledin, T., & Falkmer, T. (2008). Could sound be used as a strategy for reducing symptoms of perceived motion sickness? Journal of NeuroEngineering and Rehabilitation, 5(1), 35.
Brietzke, A., Xuan, R. P., Dettmann, A., & Bullinger, A. C. (2021). Concepts for Vestibular and Visual Stimulation to Mitigate Carsickness in Stop-and-Go-Driving. 2021 IEEE International Intelligent Transportation Systems Conference (ITSC), 3909-3916.
Cho, H., & Kim, G. J. (2020). RoadVR: Mitigating the Effect of Vection and Sickness by Distortion of Pathways for In-Car Virtual Reality. 26th ACM Symposium on Virtual Reality Software and Technology, 1-3.
Balter, S. G. T., Stokroos, R. J., Van De Laar, M. M. M., Hendrice, N., & Kingma, H. (2004). Habituation to galvanic vestibular stimulation for analysis of susceptibility to carsickness. Acta Oto-Laryngologica, 124(6), 690-694.
Ihemedu-Steinke, Q. C., Halady, P., Meixner, G., & Weber, M. (2018). VR Evaluation of Motion Sickness Solution in Automated Driving. In J. Y. C. Chen & G. Fragomeni (Eds.), Virtual, Augmented and Mixed Reality: Interaction, Navigation, Visualization, Embodiment, and Simulation (vol. 10909, pp. 112-125). Springer International Publishing.
Salter, S., Diels, C., Kanarachos, S., Thake, D., Herriotts, P., & Depireux, D. A. (2019). Increased bone conducted vibration reduces motion sickness in automated vehicles. International Journal of Human Factors and Ergonomics, 6(4), 299-318.
Kazuhito, K., & Satoshi, K. (2006). A Study of Carsickness of Rear-seat Passengers due to Acceleration and Deceleration when Watching an In-vehicle Display. Review of Automotive Engineering, 27(3), 465-469.
Morimoto, A., Isu, N., Okumura, T., Araki, Y., Kawai, A., & Masui, F. (2008). Image Rendering for Reducing Carsickness in Watching Onboard Video Display. 2008 Digest of Technical Papers—International Conference on Consumer Electronics, 1-2.
Mu, Y.-T., Chien, W.-C., & Wu, F.-G. (2020). Providing Peripheral Trajectory Information to Avoid Motion Sickness During the In-car

(56) References Cited

OTHER PUBLICATIONS

Reading Tasks. In T. Ahram, W. Karwowski, S. Pickl, & R. Taiar (Eds.), Human Systems Engineering and Design II (vol. 1026, pp. 216-222). Springer International Publishing.
Frechin, M. M., Ariño, S. B., & Fontaine, J. (2004). ACTISEAT: Active vehicle seat for acceleration compensation. Proceedings of the Institution of Mechanical Engineers, Part D: Journal of Automobile Engineering, 218 (9), 925-933.
Golding, J. F., Bles, W., Bos, J. E., Haynes, T., & Gresty, M. A. (2003). Motion Sickness and Tilts of the Inertial Force Environment: Active Suspension Systems vs. Active Passengers. Aviation, Space, and Environmental Medicine, 74(3), 220-227.
Beard, G. F., & Griffin, M. J. (2014). Motion sickness caused by roll-compensated lateral acceleration: Effects of centre-of-rotation and subject demographics. Proceedings of the Institution of Mechanical Engineers, Part F: Journal of Rail and Rapid Transit, 228(1), 16-24.
Joseph, J. A., & Griffin, M. J. (2007). Motion Sickness from Combined Lateral and Roll Oscillation: Effect of Varying Phase Relationships. Aviation, Space, and Environmental Medicine, 78(10), 944-950.
Joseph, J. A., & Griffin, M. J. (2008). Motion Sickness: Effect of Changes in Magnitude of Combined Lateral and Roll Oscillation. Aviation, Space, and Environmental Medicine, 79(11), 1019-1027.
Mert, A., & Bles, W. (2011). Impact of alignment to gravito-inertial force on motion sickness and cardiopulmonary variables. Aviation, Space, and Environmental Medicine, 82(7), 694-698.
Yusof, N. M., Karjanto, J., Sulaiman, S., Terken, J., Delbressine, F., & Rauterberg, M. (2020). Effect of improving gravito-inertial force of the vehicle occupants in reducing severity of motion sickness.
Konno, H., Fujisawa, S., Wada, T., & Doi, S. (2011). Analysis of motion sensation of car drivers and its application to posture control device. SICE Annual Conference 2011, 192-197.
Saruchi, S. 'Atifah, Mohammed Ariff, M. H., Zamzuri, H., Amer, N. H., Wahid, N., Hassan, N., & Abdul Kadir, Z. (2020). Lateral control strategy based on head movement responses for motion sickness mitigation in autonomous vehicle. Journal of the Brazilian Society of Mechanical Sciences and Engineering, 42(5), 223.
Hitike, Z., Papaioannou, G., Velenis, E., & Longo, S. (2020). Motion Planning of Self-driving Vehicles for Motion Sickness Minimisation. 2020 European Control Conference (ECC), 1719-1724.
Japanese Office Action for Japanese Application No. 2022-523245 dated Oct. 31, 2023 (9 pages).
English Translation of Japanese Office Action for Japanese Application No. 2022-523245 dated Oct. 31, 2023 (12 pages).
Extended European Search Report for European Application No. 20877891.0 dated Feb. 28, 2024 (13 pages).
Japanese Office Action for Japanese Application No. 2022-523245 dated Jul. 30, 2024 (3 pages).
Chinese Office Action for Chinese Application No. 202080080520.1 dated May 6, 2025 (16 pages).

PASSENGER STATE MODULATION SYSTEM FOR PASSENGER VEHICLES BASED ON PREDICTION AND PREEMPTIVE CONTROL

CROSS-REFERENCE TO RELATED APPLICATIONS

This application claims the benefit of U.S. Provisional Application No. 62/916,406, filed on Oct. 17, 2019. The entire disclosure of the above application is incorporated herein by reference.

GOVERNMENT CLAUSE

This invention was made with government support under 69A3551747105 awarded by the U.S. Department of Transportation. The government has certain rights in the invention.

FIELD

The present disclosure relates to a passenger state modulation system for passenger vehicles based on prediction and preemptive control.

BACKGROUND

Motion sickness in passengers when traveling in a passenger vehicle is a common condition. Moreover, passengers who are not driving the vehicle experience such motion sickness more acutely compared to the driver of the vehicle. This is due to the driver's ability to take anticipatory preemptive corrections when initiating a driving action that involves acceleration (e.g. speeding up, breaking, or taking turns). These preemptive corrections by the driver (such as tightening their abdominal core muscles when braking or leaning their body/head into the direction of the turn when turning) help prepare the driver for the accelerations associated with the driving actions slightly ahead of time, whereas the passenger ends up passively reacting to these driving actions. As a result, the passengers of a traditional (i.e. manually driven) vehicle typically suffer from motion sickness more than the driver of such a vehicle. In autonomous vehicles (AV), where every occupant is a passive passenger, the deleterious effects of motion sickness on the passenger comfort are expected to be significant.

Additionally, there is a desire to productively utilize the commute time by the non-driving passenger of a traditional vehicle as well as all the passengers of an AV. However, the linear and rotational motions of the vehicle including accelerations in all directions (i.e. forward/longitudinal direction, lateral direction, vertical direction, roll direction, yaw direction, pitch direction) during a trip negatively impact any intended productive tasks performed by a passenger (e.g. read, write, type, draw/sketch, exercise, listen to music etc.).

The motion of the passenger's body (e.g. including torso, head, limbs, etc.), the passenger's physiological states (e.g. heart-rate, blood pressure, temperature etc.), the passenger's state of comfort, the passenger's feeling of motion sickness and nausea, the passenger's productivity (i.e. her ability to carry out an intended task in a productive manner), are all examples of what is referred to as "Passenger States" in this disclosure.

This section provides background information related to the present disclosure which is not necessarily prior art.

SUMMARY

This section provides a general summary of the disclosure, and is not a comprehensive disclosure of its full scope or all of its features.

A passenger state modulation system in a passenger vehicle is presented. In one aspect, the system includes: an active seat along with a prediction algorithm and a command generation algorithm executed by a computer processor. The active seat supports a given passenger in the passenger vehicle. The prediction algorithm operates to predict a state of the given passenger and motions of the passenger vehicle preferably using machine learning methods, where the predicted motions includes acceleration of the passenger vehicle. The command generation is configured to receive the predicted state of the given passenger and the predicted motions of the passenger vehicle from the prediction algorithm. The command generation algorithm operates to determine a preemptive command to tilt the active seat and issue the preemptive command to the active seat, where the active seat is tilted in same direction as the acceleration of the passenger vehicle.

In a second aspect, the passenger state modulation system includes an active restraint. The active restrain resides in the passenger vehicle and is configured to restrain a given passenger in the passenger vehicle. In this embodiment, the prediction algorithm predict a state of the given passenger and motions of the passenger vehicle preferably using machine learning methods. The command generation algorithm is configured to receive the predicted state of the given passenger and the predicted motions of the passenger vehicle from the prediction algorithm. The command generation algorithm determines a preemptive command for the active restraint and issues the preemptive command to the active restraint.

In a third aspect, the passenger state modulation system includes an active passenger stimuli subsystem. The active passenger stimuli subsystem resides in the passenger vehicle and is configured to generate stimuli for a given passenger in the passenger vehicle. In this embodiment, the prediction algorithm predict a state of the given passenger and motions of the passenger vehicle, preferably using machine learning methods, where the predicted motions includes acceleration of the passenger vehicle. The command generation algorithm is configured to receive the predicted state of the given passenger and the predicted motions of the passenger vehicle from the prediction algorithm. The command generation algorithm operates to determine a preemptive command to stimulate the given passenger to lean in same direction as the acceleration of the passenger vehicle and issue the preemptive command to the active passenger stimuli subsystem.

In a fourth aspect, the passenger state modulation system includes an active productivity interface. The active productivity interface resides in the passenger vehicle and is configured to support a task being performed by a given passenger while the vehicle is moving. The prediction algorithm operates to predict a state of the given passenger, preferably using machine learning methods. The command generation algorithm is configured to receive the predicted state of the given passenger from the prediction algorithm. The command generation algorithm operates to determine a preemptive command for the active productivity interface and issue the preemptive command to the active productivity interface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The key idea behind the proposed Passenger State Modulation System (referred to as the PREACT System at various places in this disclosure) for passenger vehicles (e.g. relevant to all passengers of autonomous vehicles or the non-driving passengers of traditional manually driven vehicles) comprises predicting events that will impact the passenger states before they actually happen, using this prediction to decide certain preemptive interventions should be made, and making these preemptive interventions via various active sub-systems on-board the vehicle. In the PREACT system, this prediction is made by one or more computers via one or more PREACT Prediction Algorithms (e.g. data driven models, machine learning, artificial intelligence, etc.) that utilize real-time data and historically aggregated data over a period of time pertaining to, for example, route and traffic information, vehicle information, vehicle sub-systems information, passenger information, etc. to predict the route, vehicle navigation, vehicles states, vehicle sub-system states, and ultimately passenger states (including comfort, motion sickness, and productivity). A second set of computer algorithms, referred to as PREACT Preemption Algorithms (also referred to as PREACT Command Generation Algorithms), generate commands that are preemptively sent to various vehicle sub-systems (e.g. drive sub-system, steering sub-system, active seat sub-system, active restraint sub-system, active passenger stimuli sub-system, active productivity sub-system, vehicle cabin environment sub-system, vehicle audio visual sub-system, vehicle cabin lighting sub-system, etc.). These preemptive commands or corrections are implemented via the vehicle sub-systems (referred to as PREACT Mechatronic Subsystems) ahead of an event experienced by the vehicle that is expected to cause motion sickness in the passive passengers based on the aforementioned prediction. Thus, the passenger of a vehicle equipped with the PREACT system is no longer entirely passive like the non-driving passengers of a traditional manually driven vehicle and are instead more like (or even better than) the driver of a traditional vehicle.

Figures 1A, 1B, 1C:
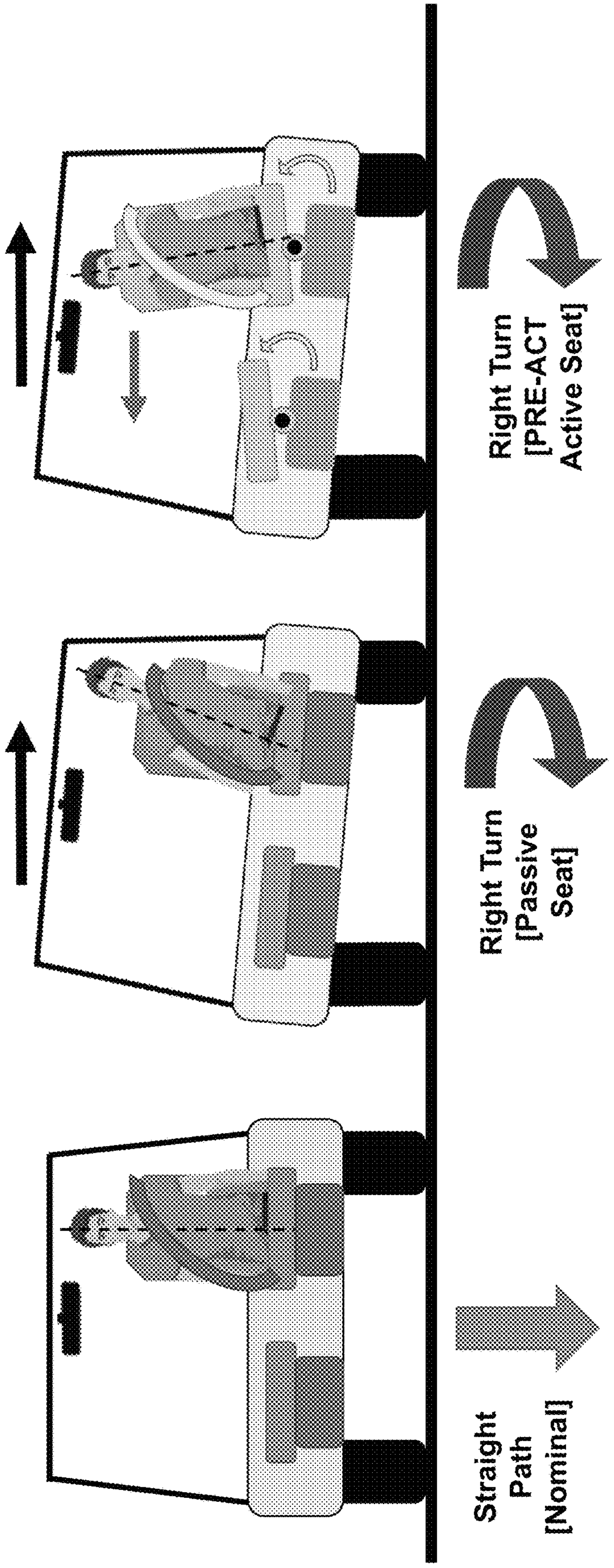
FIGS. 1A-1C are diagrams illustrating a common driving scenario of a vehicle making a right turn.
Figures 2A, 2B, 2C:
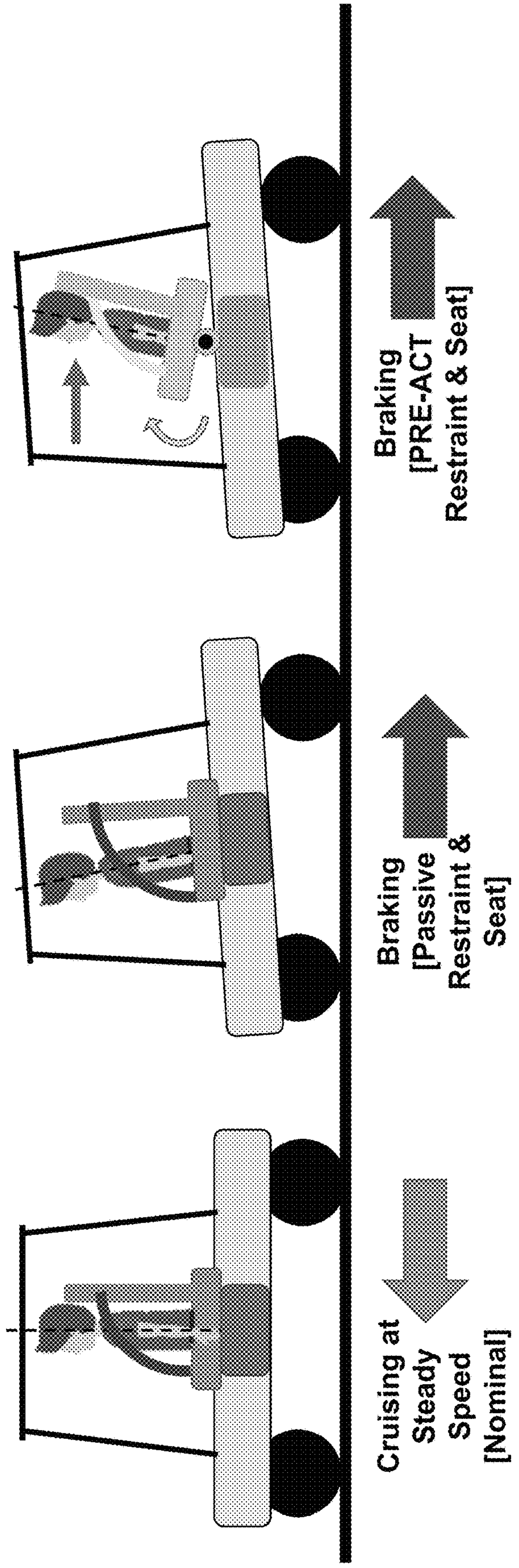
FIGS. 2A-2C are diagrams illustrating a common driving scenario of a vehicle braking.

To illustrate the PREACT system in action, two common driving scenarios are shown in FIGS. 1A-1C (a vehicle making a right turn) and FIGS. 2A-2C (a vehicle braking to slow down or come to a stop). A PREACT Prediction Algorithm uses real time and historically aggregated data pertaining to the passenger, the vehicle, vehicle subsystems, route and traffic, to predict the passenger's states (including body and limb movement, motion sickness, comfort, and productivity). Based on these predictions, the PREACT Preemption Algorithms generate and send preemptive commands to the PREACT Mechatronic Subsystem (Active Seat, in this case).

In FIG. 1A, a vehicle is shown moving straight down a path. In a vehicle without the PREACT system (as shown in FIG. 1B), as the vehicle makes the right turn the vehicle body rolls (i.e. slightly rotates) away from the direction of the turn (towards left in response to the vehicle taking a right turn). Similarly, the non-driving passenger's body including torso, head, or other limbs, etc. tend to move (e.g. sway, lean, rotate) away from the direction of turning. Such passenger motion and associated velocities, rotations, and accelerations leads to motion sickness for the passenger. On the other hand, a driving passenger (not shown) intentionally leans, or twists, or stiffens (or a combination thereof) her body, or head, or neck, or limbs, or muscles (or a combination thereof) in the direction of the turn because she has an anticipation of the vehicle's turning and its consequence on her body (i.e. that her body would be swayed outward, opposite to the direction of turn). The driver has this anticipation because she is the one who initiates the vehicle turn in the first place. The driver makes the preemptive correction of adjusting her body (e.g. including torso, head, neck, limbs, etc.) based on past experience on what such turning will do to her body. Such preemptive correction reduces the motions (including velocity, rotation, and/or acceleration) of the passenger body, resulting in lower motion sickness for the driving passenger.

This anticipatory awareness of a turn and preemptive action to lean into the turn is recreated for all non-driving passengers via the PREACT system. In a vehicle equipped with the PREACT system (shown in FIG. 1C), a Vehicle Route and Navigation Prediction Algorithm determines that the vehicle will be making a right turn at some point in the future, and a PREACT Prediction Algorithm predicts the impact this will have on passenger states (including body motion, motion sickness, comfort, productivity, etc.). This PREACT Prediction Algorithm provides the anticipation or prediction or forecast that the passenger is likely to experience motion sickness due to the vehicle turning, before the vehicle has actually started turning and the passenger has actually experienced any body motion or motion sickness.

Based on this prediction, a PREACT Preemption Algorithm (also referred to as a PREACT Command Generation Algorithm) generates preemptive commands and sends them to on-board PREACT Mechatronic Sub-Systems including an Active Seat sub-system and an Active Restraint sub-system. As a result of these preemptive commands, before the vehicle actually makes the turn, the active seat slowly begins to roll (i.e. tilt) in the direction of the anticipated turn (i.e. in the lateral direction of the centripetal acceleration of the vehicle), and the active restraint begins to slowly increase its tension in this direction. In this way, by the time the vehicle actually begins making the turn, the passenger body is in an orientation that minimizes or eliminates the motion of their body, thus reducing motion sickness and enhancing productivity. Since the Active Seat and Active Restraint began executing their actions slowly in advance of the turn, these changes can be gradual and almost imperceivable to the passenger.

Similarly, a vehicle braking is shown in FIGS. 2A-2C. In FIG. 2A, a vehicle is shown moving straight down a path at a continuous speed. In a vehicle without the PREACT System (shown in FIG. 2B), as the vehicle brakes the vehicle body and the passenger body (e.g. including head, torso, limbs, etc.) pitch forward, which can cause motion sickness, discomfort, and lack of productivity for the passenger. However, in a vehicle equipped with the PREACT system (shown in FIG. 2C), the Vehicle Route and Navigation Prediction Algorithm determines that the vehicle will be braking at some point in the future and the PREACT Prediction Algorithm predicts the impact this will have on passenger states (including body motion, motion sickness, comfort, productivity, etc.). This PREACT Prediction Algorithm provides the anticipation/prediction/forecast that the passenger is likely to experience body motion, motion sickness, discomfort, or lack of productivity due to the vehicle braking, before the vehicle has actually started to decelerate and the passenger has actually experienced any body motion or motion sickness or discomfort.

Based on this prediction, the PREACT Preemption Algorithm (also referred to as a PREACT Command Generation Algorithm) generates preemptive commands and sends them to the Active Seat sub-system and an Active Restraint sub-system. As a result of these preemptive commands, before the vehicle actually starts decelerating, the active seat slowly begins to pitch (i.e. tilt) backward (i.e. opposite to the direction of deceleration, which is equivalent to saying in the direction of acceleration in the longitudinal direction), and the active restraint begins to slowly increase its tension in the backward direction. In this way, by the time the vehicle actually begins braking, the passenger body is orientated and/or restrained such that the motion of their body is minimized, thereby reducing motion sickness and enhancing productivity.

The commands generated by the PREACT Command Generation Algorithm, the resulting actions (and resulting states) of the PREACT Mechatronic Sub-systems, the resulting states of the Passenger, are all communicated to a Data Center that is used to inform the PREACT Prediction Algorithm and the PREACT Command Generation Algorithm to further improve the efficacy of the PREACT System going forward.

Note that the PREACT Mechatronic Sub-systems (e.g. Active Seat or Active Restraint) are different from other existing Active Seat or Active Restraint sub-systems that are commanded/controlled/activated in response to an event once it has started or occurred. That would be an example of a reactive control. On the other hand, PREACT is an example of preemptive control. There are several disadvantages of reactive control. Oftentimes, in the case of reactive control, by the time sensors and the computer detects an event is happening, it is too late to make an intervention/correction that is effective. Alternatively, if a correction/action/intervention is made, it must be made in a very small period of time, which can be too disruptive for the passenger.

This Passenger State Modulation System is relevant to any kind of passenger vehicle including land vehicles that may be fully autonomous i.e. self-driving vehicles, or partially autonomous vehicles, or vehicles with driver assist features, or traditional manually driven vehicles, or a robotically driven vehicle. Land vehicles include road vehicles such as trucks, trailers, vans, various sizes of cars, two-wheelers, three-wheelers, etc. as well as off-road vehicles such as tanks, tractors, earth movers, etc. This invention is also relevant to other vehicles including those that are track based (e.g. trains, monorails, cable cars, etc.), as well as water-borne vehicles or vessels (e.g. ships and boats, hovercrafts), as well as air-borne crafts (e.g. various sizes of airplanes, gliders, etc.).

Figure 3:
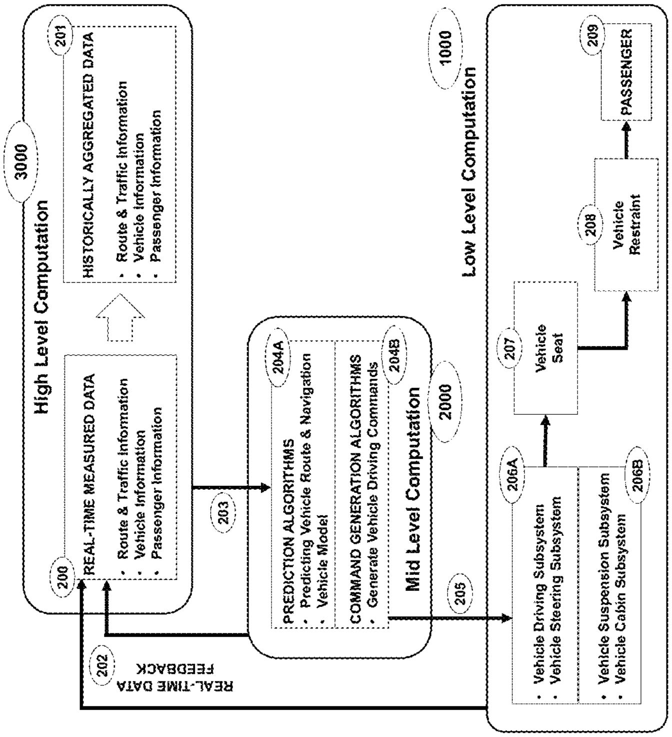
FIG. 3 is a block diagram of a typical autonomous vehicle computational architecture.
Figure 4:
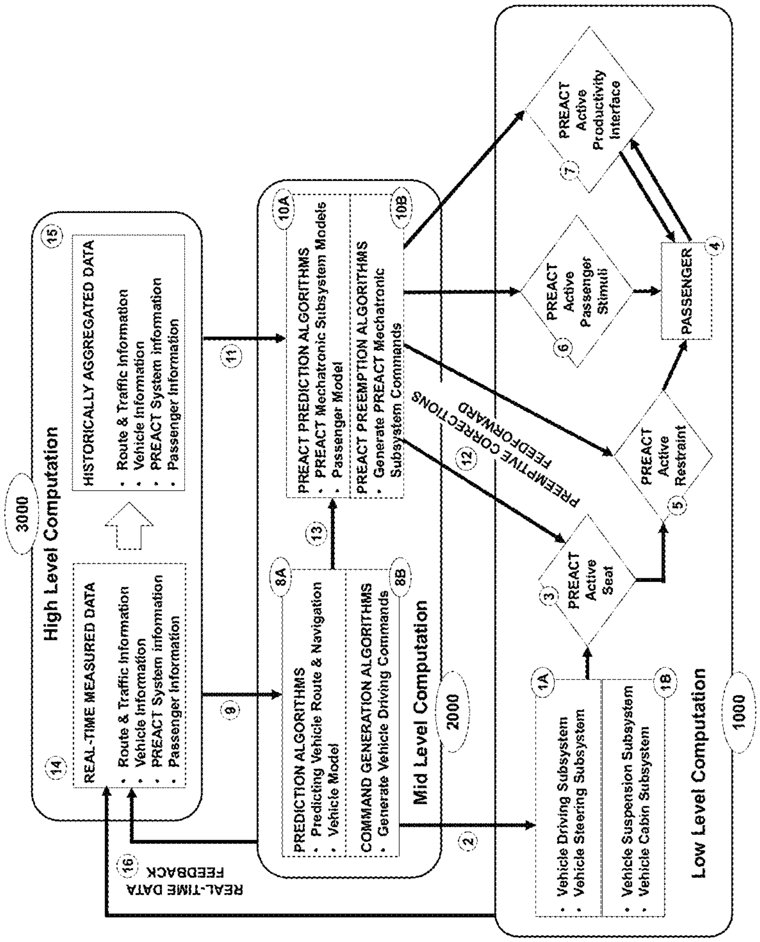
FIG. 4 is a block diagram of a computational architecture of an autonomous vehicle equipped with the PREACT system.

A typical autonomous vehicle (AV) computational architecture is captured via the block diagram shown in FIG. 3, which shows three levels of computation (high, mid, and low). A similar computational architecture for an AV equipped with the PREACT system is shown in FIG. 4. A similar computational architecture for a traditional vehicle equipped with the PREACT system is shown in FIG. 5.

These figures represent a Block Diagram in the sense that each element in this diagram is either a system (including subsystem, component, module, etc.) represented by a block or a signal (i.e. information, data, etc.) represented by a line. In the context of Systems Theory, a Block Diagram captures the flow of signals (information/data) between systems (either Physical entities e.g. a mechatronic sub-system, actuator, sensor, vehicle etc. or Computational e.g. controllers, algorithms, etc.). In contrast to a Flow Chart, a Block Diagram does not capture the chronology of events but rather the flow (represented by arrows) and processing (represented by blocks) of information that happens all the time. A Flow Chart is often used in the context of capturing an algorithm or sequence of logic steps, where chronology (i.e. sequence in the time domain) is important. FIG. 4 follows the Block Diagram representation (i.e. systems and signals) and not necessarily a logic Flow Chart. Some of the individual blocks within the Block Diagram do represent a Controller/Logic/Algorithm block, and there may be sequential/chronological logic captured within such a Controller/Logic/Algorithm block.

Figure 5:
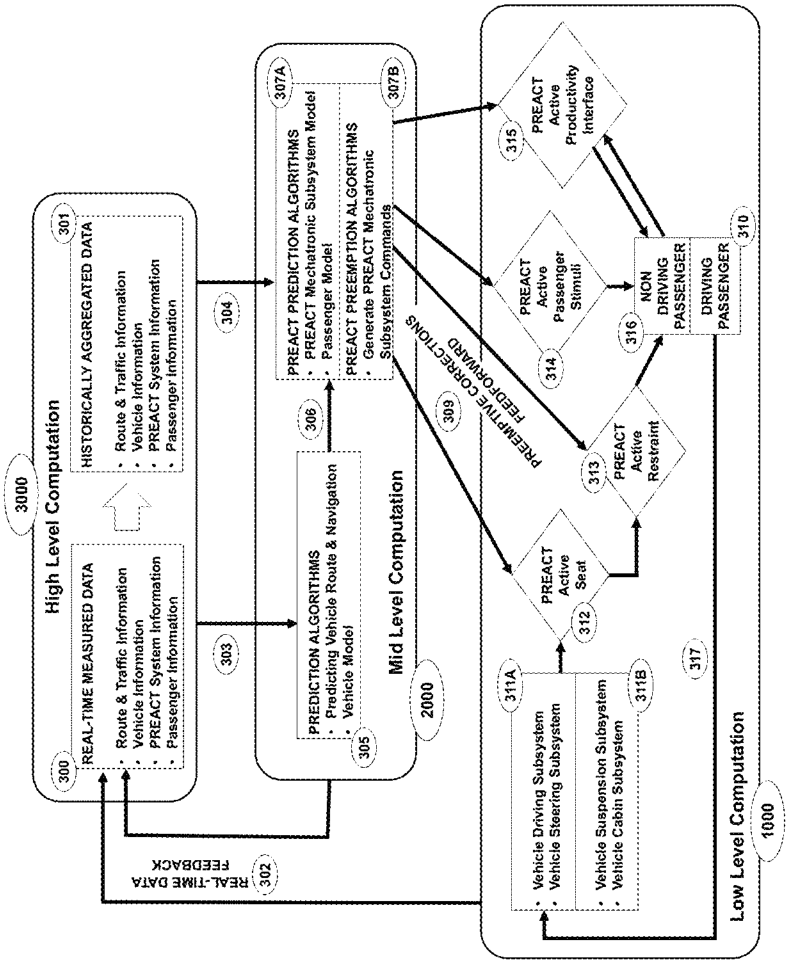
FIG. 5 is a block diagram of a computational architecture of a conventional vehicle equipped with the PREACT system.

In the Block Diagrams of FIGS. 3-5, everything is happening at all times. The computation and data flow at the Low Level happens in real time because of the physical systems and sub-systems. Several Mid Level and High Level computations can happen in computer time (i.e. as fast as computation and communication allows). This may be faster or slower than real-time or in sync with real-time.

The Block Diagrams of FIGS. 3-5 represent computational architectures—each block represents a subsystem which is an algorithm or physical system. This computational architecture does not necessarily represent a physical location for a computer or physical component. Computation is broadly defined as any calculation and analysis of information, and control of hardware. Such computation can happen on various on-board (i.e. on the vehicle computers, microcontrollers, microprocessors, integrated circuits, memory etc.) or on multiple vehicles, or remote servers (e.g. cloud computing), etc.

In FIG. 3, at the Low Level (1000) of the computational architecture are the vehicle and its various subsystems. The vehicle subsystems include passive subsystems and active subsystems. Passive subsystems do not involve active control in real-time, e.g. traditional suspension system, traditional seats, traditional seatbelts, etc. One can change/update the parameters of these passive subsystems from time to time (e.g. adjust the position or recline of the seat, or tune the suspension) but the dynamic variables associated with these subsystems are not actively controlled in real time to meet some desired objective. Passive subsystems may have sensors that measure the states of these subsystems but these states are not actively controlled. An example of a passive vehicle subsystem is a suspension seat with springs and dampers—while the exact position of the seat can be measured by a sensor, the position and orientation of the seat is not controlled in real-time, it's determined by the springs and dampers.

On the other hand, active subsystems are actively controlled via some computer (e.g. microprocessor) to ensure that their states (that are variables in time) follow some desired objective with time. Examples of such active subsystems within the vehicle are active roll control, active suspension, active seats, active seat-belts, active cabin environment, etc. For example, the motions and stiffness of an active suspension subsystem can be actively controlled in real time, independent of the fact that its motion is also measured using sensors.

In an AV, the vehicle subsystems may include Vehicle Drive Subsystem and, Vehicle Steering Subsystem (206A), Vehicle Seat Subsystem (207), Vehicle Restraint Subsystem (208). The Vehicle Drive Subsystem (206A) may comprise vehicle drivetrain components such as the engine/motor, drivetrain transmission, and ultimately the wheels. The Vehicle Steering Subsystem (206A) may comprise steering input (e.g. motor or other actuator), steering transmission, steering linkage, etc. and ultimately the wheels.

There may be Others Subsystems (206B) e.g. the Vehicle Suspension Subsystem and Vehicle Cabin Subsystem. The Vehicle Suspension Subsystem includes components such as the suspension, shock absorbers, and wheels. The Vehicle Cabin Subsystem includes the air conditioning, heating, and ambient lighting and sound in the vehicle. The Vehicle Drive (206A) Subsystem is responsible for controlling the motion of the vehicle.

Upon receiving driving and steering commands (205), the Vehicle Drive and Steering Subsystems (206A) causes the vehicle to achieve certain vehicle states (e.g. position, velocity, acceleration, roll, pitch, yaw, turning, etc.) as governed by the vehicle dynamics. These subsystems impact the above-mentioned states of the vehicle body and chassis. These states impact the Vehicle Seat (207) as the vehicle seat is attached to the vehicle chassis. The Vehicle Seat (207) and Vehicle Restraint (208) influence the passenger states (e.g. body motion, physiological states, motion sickness, comfort, productivity, etc.) as the Passenger (209) is seated on the Vehicle Seat (207) and restrained by the Vehicle Restraint (208).

The Mid Level (2000) of the computational architecture of FIG. 3 includes Vehicle Algorithms that are used for planning, predicting, and generating the commands to be sent to the Vehicle Subsystems at the Low Level. The Vehicle Route and Navigation Prediction Algorithm (204A) conducts route planning and predicts the optimal vehicle navigation, based on historically aggregated and real-time measured data (203) received from the High Level (3000), which represents a Data Center. Based on these predictions as well as data (203), the Command Generation Algorithm (204B) generates and sends driving and steering commands (205) to the Vehicle Driving and Steering Sub-Systems (206A).

At the High Level (3000), data may be aggregated from multiple vehicles, over multiple trips, made between multiple destinations, and made by multiple people over time and therefore serves as a transportation system level Data Center. This data that is aggregated over time is collectively known as historically aggregated data (201). In addition real time data (202) from the vehicle and its subsystems as well as the passenger may be measured via various sensors and sent to the Data Center, and is collectively known as Real Time Measured Data (200). The data is compiled and processed here to filter out spikes and noise so that the most reliable data can be made available to the Vehicle Algorithms in the Mid Level (2000). The Vehicle Route and Navigation Prediction Algorithm (204A) can predict well ahead of time when and where the vehicle should take a turn, for example, and the Command Generation Algorithm (204B) generates the command (205) at the appropriate time to make this turn happen. This command (205) is sent to the Vehicle Driving and Steering Subsystems (206A).

Described thus far is a representative computational architecture for existing autonomous vehicles (AV). Next, FIG. 4 shows the computational architecture for an AV equipped with the PREACT system, captured via a Block Diagram. Once again, there are three levels of computation strategy that seamlessly integrate data aggregation and analytics, predictive algorithms, preemption algorithms, and mechatronic subsystems, all of which work in conjunction to modulate the passenger states. In FIG. 4, blocks (3), (5), (6), (7), (10A), (10B), and parts of (14) and (15), specifically PREACT System and Passenger Information, represent the unique additional modules associated with the PREACT system that augments an existing autonomous vehicle (AV) architecture shown in FIG. 3.

At the Low Level (1000) of the computational architecture in FIG. 4, there are various vehicle subsystems. As indicated previously, vehicle subsystems can be passive or active. Of all the active subsystems, some or all are commanded preemptively by the PREACT Preemption Algorithm (10B) with the objective of altering Passenger States such as reducing body motion, including, reducing motion sickness, and/or improving productivity. The subset of active vehicle subsystems that are preemptively commanded/controlled by the PREACT Preemption Algorithm (10B) are referred to as the PREACT Mechatronic Sub-Systems. Examples of the latter include PREACT Active Seat (3), PREACT Active Restraint (5), PREACT Active Passenger Stimuli (6), and PREACT Productivity Interface (7).

In one embodiment, the other vehicle subsystems (1B) such as Vehicle Suspension Subsystem, Vehicle Cabin Subsystem may not be commanded by the PREACT Preemption Algorithm (10B). In yet another embodiment, these subsystems as well as any not shown in FIG. 4 (e.g. Active Roll Control, Anti-lock Braking, Active Chassis, etc.) can be controlled and commanded by PREACT Preemption Algorithm (10B) to influence the motion/movement, motion sickness, comfort and productivity of the Passenger (4). In that case, all such subsystems will be included in the PREACT Mechatronic Subsystems.

The driving and steering commands (2) in FIG. 4 generated by the vehicle driving command generation algorithm (8B) are sent to the Vehicle Driving and Steering subsystems (1A). In response to these driving and steering commands (2), the Vehicle Driving and Steering subsystems (1A) causes the vehicle body/chassis to achieve certain vehicle states (e.g. position, velocity, acceleration, roll, pitch, yaw, turn, etc.) as governed by the vehicle dynamics. In an AV equipped with the PREACT system, there is at least one and possible more PREACT Mechatronic Subsystems. FIG. 4 features a PREACT Active Seat (3) that can be actuated with certain motions (e.g. tip, tilt, heave, yaw, etc.) with respect to the vehicle body/cabin/chassis. Furthermore, the passenger (4) is restrained to this seat via a PREACT Active Restraint (5) comprising a harness with multiple anchor points that can be selectively tightened when commanded. Additionally, the passenger (4) is presented with PREACT Active Passenger Stimuli (6) that can include visual, audio, or vibrotactile inputs. Additionally, the passenger (4) can perform productive tasks in the vehicle (e.g. reading a book, typing and reading information on a display, etc.) by interacting with the PREACT Active Productivity Interface (7). The latter can help reduce motion sickness and enhance productivity e.g. by tracking the gaze of the passenger and moving the display so that it moves synchronously with the passenger.

The passenger states (body motions, physiological states, motion sickness, comfort, productivity) are impacted by the Vehicle Drive and Steering Subsystem (1A), Active Seat (3), Active Restraint (5), and the passenger's (4) response to the Active Passenger Stimuli (6), and Active Productivity Interface (7). In particular, the passenger has a two way (bidirectional) interaction with the Active Productivity Interface (7) which is represented by arrows moving in both directions between the Passenger (4) and the Active Productivity Interface (7). This means that the passenger provides inputs to the Active Productivity Interface (7) e.g. via typing on a keyboard, and the Active Productivity Interface (7) provides inputs to the Passenger (4) e.g. by tilting or adjusting the surface that the keyboard rests on.

The Mid Level (2000) of this system architecture includes Vehicle Algorithms whose computation is used for planning, predicting, and generating the commands to be sent to the Vehicle Subsystems at the Low Level. The Vehicle Route and Navigation Prediction Algorithm (8A) conducts route planning and predicts the optimal vehicle navigation, based on historically aggregated and real-time measured data (9) received from the High Level (3000), which represents a Data Center. Based on these predictions as well as data (9), the Command Generation Algorithm (8B) generates and sends driving and steering commands (2) to the Vehicle Driving and Steering Sub-Systems (1A). However, in this case there are additional PREACT Prediction Algorithms (10A) and PREACT Preemption Algorithms (10B) that work in conjunction with the Vehicle Route and Navigation Prediction Algorithm (8A) and the Vehicle Driving Command Generation Algorithm (8B). The PREACT Algorithms (10A) and (10B) also receive and utilize historical and real-time data (11) from the High Level (3000) Data Center. The PREACT Prediction Algorithm (10A) works in two ways (short-term preemption and long-term preemption), as described below, to provide Preemptive Corrections/Commands (12) to the PREACT Mechatronic Subsystems such as Active Seat (3), Active Restraint (5), Active Passenger Stimuli (6), and Active Productivity Interface (7).

First, short-term preemption is described. In this case, the instant the Vehicle Driving Command Generation Algorithm (8B) sends a driving and steering command (2) to the Vehicle Driving and Steering subsystems (1A), the same instant this command is also shared with (13) the PREACT Algorithms (10A and 10B). As a result, the PREACT Preemeption Algorithm (10*b*) sends Preemptive Corrections (12) to the PREACT mechatronic subsystems. These preemptive corrections are possible because the response time/dynamics of these mechatronic sub-systems is much faster (given their more compact size) than that of the Vehicle Driving and Steering subsystems (1A). In other words, by the time the effect of the driving command (2) results in the vehicle reaching the intended states (e.g. acceleration, braking, or turning), the driving command (13) and associated corrections (12) have already been "fed forward" to the PREACT mechatronic sub-systems. Because of the faster response of the latter, they start to favorably alter the passenger states slightly ahead of the inertial events (e.g. acceleration, deceleration, turning etc.) associated with the vehicle states.

Second, long-term preemption is described. In this case, another component of the Preemptive Corrections (12) generated by the PREACT Preemption Algorithm (10B), also referred to as the PREACT Command Generation Algorithm, is based on historical and real-time data (11) from the High Level (3000) Data Center. At the High Level (3000), data is collected from real-time measurements (14) and aggregated over time (15) from multiple sources. This includes historical traffic pattern data as well as real-time traffic patterns (e.g. an accident that causes a traffic jam) at the time the AV is making a trip. This data includes information related to static road infrastructure (e.g. stop signs, traffic light location and schedule, speed bumps, dividers, the curvature of exit ramps, etc.) as well as any temporary pothole or traffic cone. Additionally, this data includes the vehicle information (make, model, year, vehicular dynamic model) and real-time measurements of vehicle states (position, velocity, acceleration, turning, vertical bumps, etc.). All this data is typically already employed in existing AV architectures. However, for an AV equipped with the PREACT system, additional data types include the information of the PREACT mechatronic subsystems and passenger information (including their parameters such as size, weight, etc. and states). This data is collected over time (i.e. multiple trips) as well as measured in real-time. Examples of the PREACT mechatronic subsystem states include tip/tilt angles of the active seat, the tension of the seat-belt, response times, productivity interface interactions, etc. The passenger states include mechanical variables such as body lean angle, head tilt angle, head acceleration, and angular velocity, etc. as well as physiological states such as electrodermal activity, heart rate, skin temperature, and respiration, etc.

At the High Level (3000), data is aggregated from multiple vehicles, over multiple trips, made between multiple destinations, and made by multiple people over time and therefore serves as a transportation system level Data Center. The data is compiled and processed here to filter out spikes and noise so that the most reliable data can be made available to the Vehicle Route and Navigation Prediction Algorithm (8A), Vehicle Driving Command Generation Algorithm (8B), PREACT Prediction Algorithms (10A), and PREACT Preemption Algorithms (10B). Based on this data, the Vehicle Route and Navigation Prediction Algorithm (8A) can predict/anticipate well ahead of time that the vehicle is approaching a turn, for example, and that a turning command (2) will be sent to Vehicle Driving and Steering Subsystems (1A). As a result of this prediction, the PREACT Prediction Algorithms (10A) can predict and anticipate inertial events (i.e. those associated with accelerations) and the impact of them on the Passenger States. Accordingly, the PERACT Preemption Algorithms (10B) determine/generate Preemptive Corrections (12) even before the current turning command (2) has been sent to the Vehicle Driving and Steering Subsystem (1). As a result, the PREACT Preemption Algorithm (10B) can command the Active Seat (3) to start tilting (gently and gradually) into the intended direction of the turn (see FIG. 1), even before the turn has started or taken place. Similarly, the PREACT Preemption Algorithm (10B) can command the Active Restraint (5) to selectively tighten to gently tug the passenger's (4) torso into the direction of the turn, starting slightly before the turn has started. Thus, the PREACT system architecture is based on a combination of feedback (16), which reacts to real-time information and provides either no anticipation or short-range anticipation (depending on the spatial measurement range of real-time sensors), and feedforward (12) that is based on either short-term or long-term anticipation/prediction by PREACT Prediction Algorithms (10A) and implemented by PREACT Preemption Algorithms (10B).

The PREACT system can also be used in a traditional (i.e. manually driven) vehicle that is only partially autonomous (e.g. driver assist) or not autonomous at all. The system architecture for such a vehicle equipped with the PREACT system is shown in FIG. 5. The blocks (3), (5), (6), (7), (14), (15), (16), (9), (11), (12), (10A), (10B), and (13) in FIG. 4 are identical to the blocks (312), (313), (314), (315), (300), (301), (302), (303), (304), (309), (307A), (307B), and (306) in FIG. 5 in that order. A driving passenger (310) is a passenger in the vehicle who provides driving and steering commands to the Vehicle Driving and Steering subsystems (311A). The driving passenger (310) is different from the non driving passenger (316) as shown in the figure. As noted previously, since the driving passenger commands the vehicle driving and steering actions, she has an anticipation of the consequence of these actions and has the ability to preemptively adjust her body. However, the non driving passenger does not have the benefit of such anticipation and therefore does not make any preemptive corrections herself. In a traditional vehicle without the PREACT system, this lack of anticipation and preemptive correction can lead to undesirable passenger states (more body movement, more motion sickness, less productivity).

However, in a traditional vehicle equipped with the PREACT system, the PREACT Prediction Algorithms (307A) predict future events and the PREACT Preemptive Algorithms (307A) provide preemptive commands (309) to the non driving passenger, with the goal of favorably modulation the passenger states (e.g. reduce motion sickness, improve productivity). While the driving passenger (310) has his own anticipatory and preemptive correction, the PREACT System can augment this and benefit him as well. In this case, a Vehicle Route and Navigation Prediction Algorithm (305) does not send the driving and steering commands to the Vehicle Driving and Steering subsystems (311A). But Vehicle Route and Navigation Prediction Algorithm (305) provides inputs (306) to PREACT Prediction Algorithms (307A).

The PREACT Prediction Algorithms (307A) receives: real-time and historically aggregated data (304) from the High Level (3000) data center; predicted driving and steering commands (306) from the Vehicle Driving and Navigation Prediction Algorithm (305); and/or real-time driving and steering commands (317) from the driving passenger (310). The latter is available to the PREACT Prediction Algorithms (307A) via the real-time data feedback (302) going to the Real-time Measured Data (300) in the High level (3000) data center, and flowing to (307A) via data input (304). The real-time and historically aggregated data (304) pertains to the route & traffic information, vehicle information, vehicle subsystems (including PREACT Mechatronic subsystems), and passenger information (including driving and non driving passengers). The PREACT Prediction Algorithms (307A) uses these inputs to predict the timing and occurrence of passenger states, and based on these predictions the PREACT Preemption Algorithms (307B) generate and send preemptive corrections/commands (309) to the various PREACT Mechatronic Subsystems including PREACT Active Seat (312), PREACT Active Restraint (313), PREACT Active Passenger Stimuli (314), and PREACT Active Productivity Interface (315).

Detailed Description of PREACT System

Figure 6:
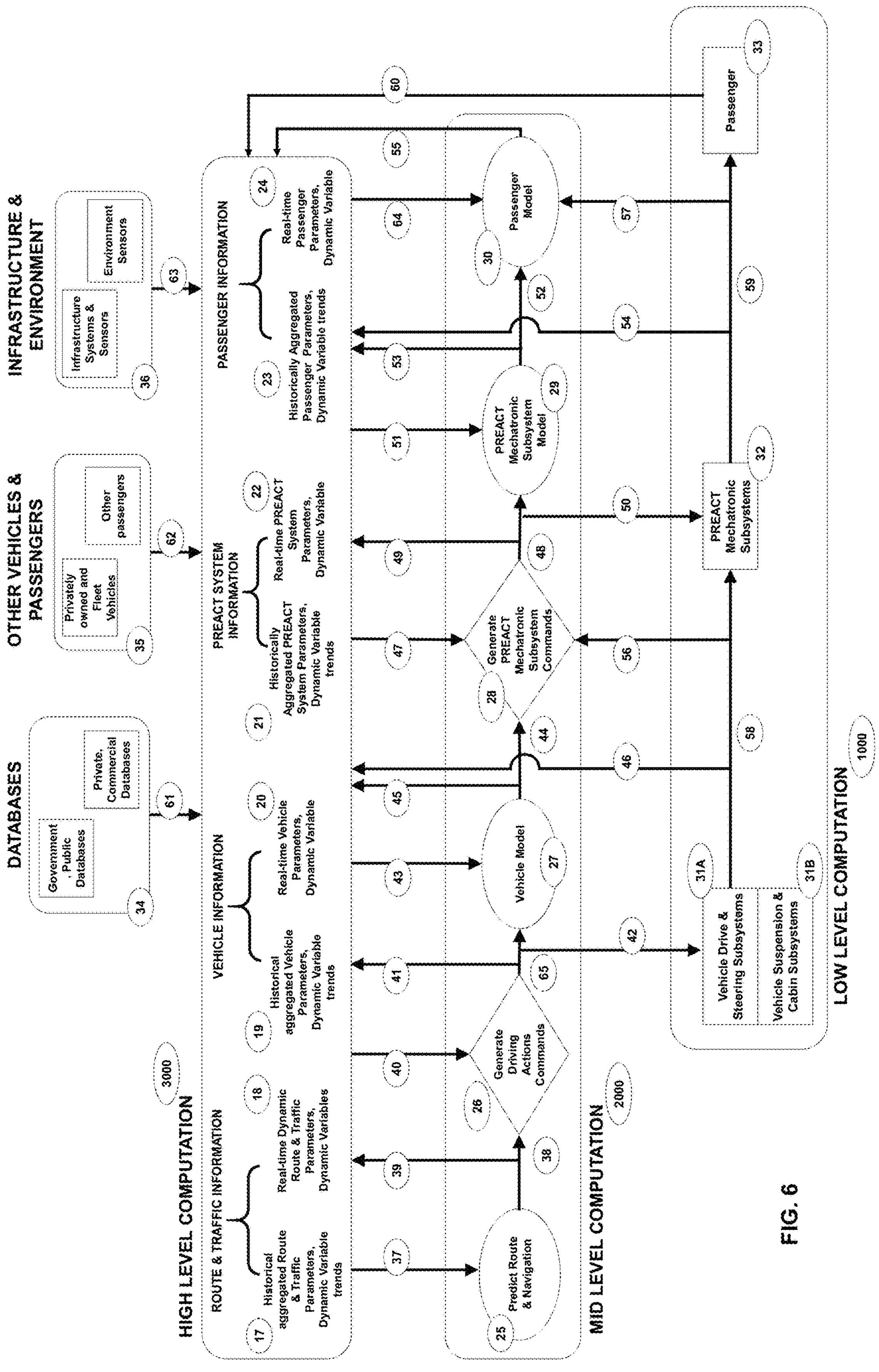
FIG. 6 is an expanded version of the block diagram shown in FIG. 5.

FIG. 6 depicts an expanded version of FIG. 4. The blocks in FIG. 4 and FIG. 6 are analogous to each other. Across both FIGS. 4 and 6, the architecture levels (e.g. High, Mid, Low Level Computation) are the same. The PREACT Mechatronic Subsystems (32) in FIG. 6 includes the PREACT Active Seat (3), PREACT Active Restraint (5), PREACT Active Passenger Stimuli (6), and PREACT Active Productivity Interface (7) from FIG. 4. The Passenger (4) in FIG. 4 corresponds to the Passenger (33) in FIG. 6. The Vehicle Driving and Steering Subsystems (1A) in FIG. 4 is identical to the Vehicle Drive and Steering Subsystems (31A) in FIG. 6. Prediction Algorithms (8A) in FIG. 4 includes Vehicle Model (27), and Generate Route & Navigation Commands (25) in FIG. 6. Command Generation Algorithms (8B) in FIG. 4 includes Generate Diving Actions Commands (26) in FIG. 6. PREACT Prediction Algorithms (10A) in FIG. 4 includes PREACT Mechatronic Subsystem Model (29), and Passenger Model (30) in FIG. 6. PREACT Preemption Algorithms (10) in FIG. 4 includes the "Generate PREACT Mechatronic Subsystem Commands" (28) in FIG. 6. The Real Time Measured Data (14) and Historically Aggregated Data (15) in FIG. 4 is a combination of Route & Traffic Information (17, 18), Vehicle Information (19, 20), PREACT System Information (21, 22), and Passenger Information (23, 24) in FIG. 6. The Driving and Steering Commands (2) and Other Information sent from the Mid Level to the Vehicle Drive and Steering Subsystems (1A) at the Low Level is analogous to the flow of information in FIG. 6 shown by (42). The Preemptive corrections (12) in FIG. 4 are represented by (50). The Real Time Feedback (16) in FIG. 4 is analogous to flow of information in FIG. 6 shown by (39, 41, 45-46, 49, 53-55, 60). The flow of information (9) from the Data Center (3000) to the Vehicle Route and Navigation Prediction Algorithm (8*a*) and the Vehicle Driving Command Generation Algorithm (8*b*) in FIG. 4 is analogous to the flow information in FIG. 6 shown by (37, 40, 43). The flow of information (11) from the Data Center to the PREACT Algorithms (10*a* and 10*b*) in FIG. 4 is analogous to the flow of information in FIG. 6 shown by (47, 51, 64). The following sections describe the overall system shown in FIG. 6 in detail—the block reference numbers pertain to block numbers in FIG. 6.

Figure 7:
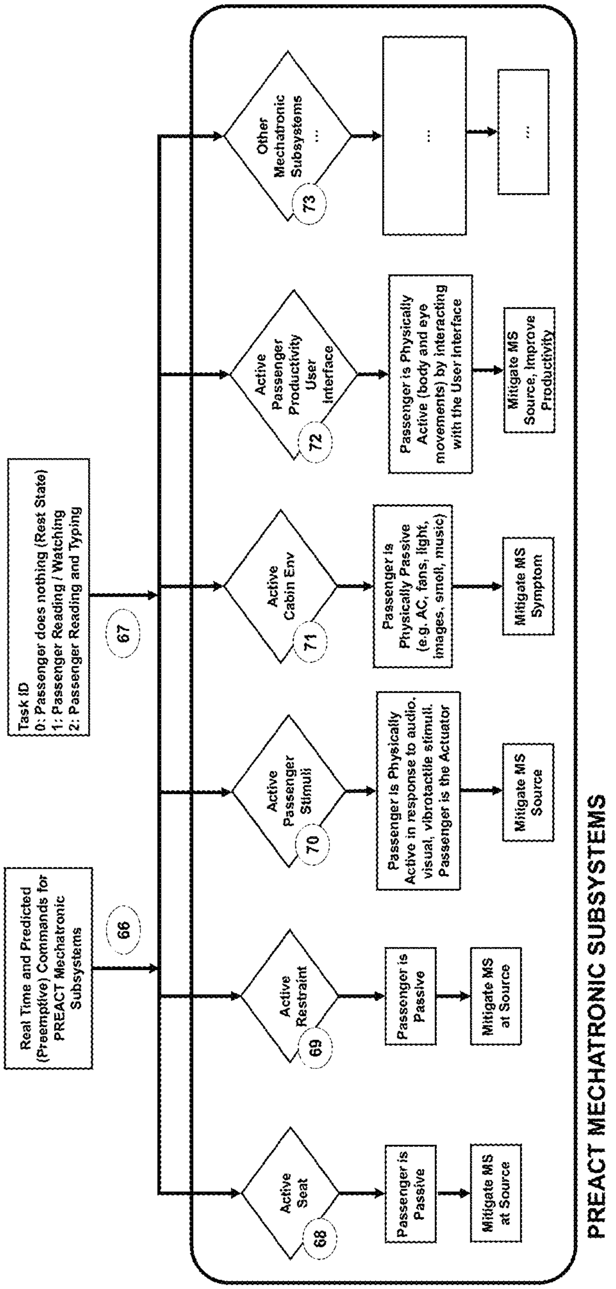
FIG. 7 is a detailed breakdown of the PREACT mechatronic subsystem shown in FIG. 6.

FIG. 7 provides a more detailed breakdown of the PREACT Mechatronic Subsystem (32) block shown in FIG. 6. However, FIG. 7 is not a block diagram; rather, it is a chart of various possible PREACT Mechatronic Subsystems (32). FIG. 7 shows additional details of the interaction between inputs (50) and PREACT Mechatronic Subsystems (32) in FIG. 6. Specifically, how the PREACT Mechatronic Subsystems (32) use the commands and other information (50) from the mid level computation (2000) to determine the actions of the Active Seat (68), Active Restraint (69), Active Passenger Stimuli (70), Active Cabin Environment (71), and Active Productivity Interface (72). The current and preemptive commands (50) in FIG. 6 and (12) in FIG. 4 are analogous to (66-67) in FIG. 7. In FIG. 7, the PREACT Mechatronic Subsystems are (68-70, 72) are analogous to FIG. 4 (3, 5-7), respectively. In addition, other additional possible PREACT Mechatronic Subsystems such as the Active Cabin Environment (71) are also shown in FIG. 7.

Data Center—High Level Computation (3000)

The Data Center (3000) comprises data compilation, consolidation, and storage. It represents the highest level of computation within the PREACT system architecture shown in FIG. 6. The data is collected in real-time at all times and stored over time; the stored data becomes a part of the historical data in the data center. The entire data stream (a combination of real-time and historical data of the same type) is available to the rest of the PREACT system, and this data is constantly updated. The terms "Data" and "Information" are used interchangeably in this document. The data collected may be aggregated. Data aggregation refers to an amalgamation or synthesis of multiple data streams from various sources that are compiled together in appropriate formats. In addition to synthesizing multiple data streams, the same or similar data from multiple sources will be compiled and reconciled. Historical or past data can be analyzed for multiple purposes such as (but not limited to) to determine patterns and trends, and thereby help predict future events and such predictions can be used to take preemptive actions. This prediction can be achieved through online machine learning, offline machine learning, or some combination thereof. The data center collects data from and sends data to various sources which include other databases (34, 61). It collects measurement data (54) from the sensors of the PREACT mechatronic subsystems (32); it collects measurement data (46) from the sensors of various Vehicle Subsystems (31A and 31B); it collects measurement data (54) from the sensors of various PREACT Mechatronic Subsystems (32); it collects data (60) from the onboard sensors, wearable electronic devices, personal electronic devices such as tablets and computers that measure the passenger (33) states and parameters; and it collects data (62) from other PREACT and non PREACT vehicles (35) and other passengers in other vehicles; and it collects data (63) from infrastructure and environment sensors (36). Here non PREACT vehicle refers to any vehicle that is not equipped with the PREACT system but is still capable of providing relevant information to the PREACT computational system through direct (e.g. V2V communication) or indirect communication (e.g. through an intermediate database).

Data communication can be achieved through wired communication, wireless communication such as WiFi, Bluetooth, NFC, etc., or any combination thereof. The data communication may include any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Communication networks include wireless communication networks (e.g., using Bluetooth, IEEE 802.11, etc.), local area networks (LAN) and/or wide area networks (WAN), including the Internet, providing data communication services.

Some of the data collected may be corrupt, noisy, or otherwise damaged and unusable or harmful. To ensure that good quality of data is stored and used for computation, the data center will process and evaluate all information it receives and assign it a confidence value. Information with an adequate confidence value will be stored by the data center, and used for all further computation. Some of the data collected by the data center will come from environmental sensors and other estimators mounted on or in vehicles, passengers, and infrastructure sensors. The data from such sensors may be noisy. The data center will employ filters and other techniques that can 'clean' the data and remove the noise so that the data can be used by the data center for storage and processing and make available to the various algorithms at the Mid Level (2000).

Data classification describes the classes of data (e.g. parameters and dynamic variables). Further, these data classes span the various types of data collected by the Data Center (3000) and used by the Vehicle Algorithms (2000). Data types describe the diverse kinds of data collected and used by the system (e.g. route & traffic information, vehicle information, passenger information, etc.). Parameters are information that defines the system and does not necessarily require time domain information at all times. For example, the width of the road or the length of the vehicle is a parameter and it is not expected to vary with time, especially vary in real time. While parameters typically do not dynamically vary with time; however they might change periodically and hence may require monitoring. These changes to the parameters can be intentional or unintentional. For example, intentional changes to the parameters include construction activity along the route which restricts the route, and unintentional changes to the parameters include a change in tire diameter due to wear and tear, or a flat tire, or components breaking down. Dynamic variables are information that constantly evolves with time and is influenced by various factors and inputs. For example, the speed of the vehicle, traffic density, etc. are dynamic variables that constantly change with respect to time. Dynamic variables for a type of data are also referred to as states. For example, the speed of the vehicle is a dynamic variable and can also be called a vehicle state. Similarly, the heart rate and/or motion sickness of a passenger are dynamic variables and can also be called a passenger state.

The various types of data (i.e. information) gathered by the data center (3000) are described below:

a. Route & Traffic Information (17, 18): This information captures the parameters and dynamic variables that describe the route and associated traffic conditions along the route. This includes traffic pattern data (e.g. historical information on traffic jams likely at a given time of the day, real-time traffic condition caused by an accident or change in road conditions, etc.), road parameters (e.g. curvature of turn, road roughness, the width of the road, number of lanes, etc.), and infrastructure parameters (e.g. location of stoplights, error or breakdown of lights, etc.) and infrastructure states (e.g. the timing of switching of stop lights). Information can be gathered from various sources which can include (but not limited to) other vehicles (35), infrastructure sensors (36). This data can be collected (46, 54, 60) from vehicle-mounted sensors, and databases (34) and real time measurements (36) using satellite imagery.

b. Vehicle information (19, 20): This information captures the parameters and dynamic variables that describe the vehicle and its associated operating conditions. This includes parameters that define the make, model, and physical attributes of the vehicle. This includes size, weight, inertia, wheel span, engine horse power or battery capacity, suspension stiffness and damping, etc. It also includes dynamic variables including the vehicle motion states (position, velocity, acceleration, turning, roll, pitch, yaw, etc.), and vehicle cabin states (temperature, light, audio volume etc.). Information can be gathered from various sources which can include (but not limited to) vehicle-mounted sensors, infrastructure sensors (e.g. an external camera mounted on a pole/ building/overpass that captures the vehicle location, velocity, acceleration), sensors on other vehicles, and user-reported data.

c. PREACT Mechatronic Subsystem Information (21, 22): This information describes the parameters and dynamic variables that describe the vehicle subsystems, particularly the PREACT mechatronic subsystems, which include hardware and software. The PREACT mechatronic subsystems include active seat (3), active restraint (5), active passenger stimuli (6), active productivity system (7), etc. Parameters can include the physical attributes of the PREACT mechatronic subsystems (e.g. size, weight, response time, etc.) while dynamic variables (or states) can include acceleration, velocity, and position. This data can be collected in every trip, and data can also compared across multiple trips of the same passenger in the same vehicle.

d. Passenger Information (23, 24): This information captures the parameters and dynamic variables that describe passenger states. Passenger states refer to passenger physiological information, motion of the passenger's body, comfort level, productivity level. Parameters include passenger preferences, passenger weight, height, motion sickness susceptibility, and other biometrics. Other examples of parameters include the passenger preferences e.g. indicating through an interface whether they are experiencing motion sickness or a drop in productivity state (e.g. productivity level) at some point during the journey. Wearable type sensors worn by the passenger or sensors in the vehicle (e.g. imaging camera, motion detectors) cabin can determine the various passenger data. Dynamic variables include the physiological condition of the passenger (such as heart rate, perspiration, blood pressure), and motion of passengers (such as kinematics and dynamics of passenger body/torso/limbs/head).

The above data types are discussed in detail in the following sections. The aggregated data can be used for long term computation and aggregated analysis. This analysis can leverage machine learning, artificial intelligence, data science, or any combination thereof of predictive algorithms and techniques to generate insights from this collective data which cannot otherwise be determined. Such insights can be used to inform the design of the algorithms at the mid level computation and the algorithms that control the actions of the PREACT mechatronic subsystems within the vehicle.

Route and Traffic Information (17, 18 in FIG. 6)

The scope of route and traffic information can include traffic-related information, traffic patterns, navigation routes, and driving-related information such as past route selection, driving profiles (acceleration, braking, turning, etc.), etc. collected live in real-time from trips that are still active/ongoing. The route is defined as the path that connects the origin and destination of a vehicle journey, and any stops or events along the way to the destination. Associated with the vehicle's route is traffic information which is defined as a broad set of parameters and variables that define the journey such as traffic congestion, states of traffic lights, states of roads along the path, etc. The Data Center (3000) that serves the PREACT system collects this information from multiple sources such as other vehicles (32), user-reported data (60), infrastructure sensors (63), databases of existing applications (such as Google Maps) (61), satellite imagery (63), etc. Data across multiple sources is reconciled to increase the confidence and fidelity of data used by the PREACT Algorithms. For example, if a specific road segment is known for having higher lateral acceleration magnitudes based on past aggregated data, but during a specific real-time trip the experienced acceleration is lower than anticipated, analysis to determine the source of such discrepancies can be performed such that the prediction accuracy is improved in the future.

Driving related information includes driving actions (65, 41); Driving actions refers to any and all planned (in-queue) for the future and current decisions made by the "Generate Driving Actions Command" algorithm (26) pertaining to the control and maneuvers (e.g. acceleration, braking, cruise, turning, etc.) of the autonomous vehicle. This data is constantly updated as the trip progresses, and some or all of this data can be used to influence the still active/ongoing trip and associated PREACT preemptive commands (50). The historical traffic information is an ever-increasing datastream that collects traffic information from various sources and stores it in order to give insight for upcoming trips where vehicles that might adopt a similar route. This information is collected through vehicle sensors such as medium/long-range sensors (such as LiDAR), IMU sensors, GPS, etc. This information is also collected from various infrastructure sensors (e.g. traffic cameras). Further, vehicle to vehicle (V2V), vehicle to infrastructure (V2I), and infrastructure to vehicle (I2V) communication enables the collection of data not only within the scope of the given vehicle but also the overall traffic and other physical environment around the vehicle. The collection of such data happens in the scope of static road structures (e.g. lanes, dividers), as well as dynamic road conditions (e.g. temporary traffic cones).

Vehicle Information (19, 20 in FIG. 6)

Vehicle information (i.e. vehicle data) includes parameters and dynamic variables that can be used to define the attributes and states of the vehicle. This information can be sourced from vehicle sensors (46), user reported data (60), data reported by other vehicles (62), etc. Real-time Vehicle Sensor information includes all information and data gathered in real-time from the vehicle. Vehicle sensors can be of two types—internal and external. External vehicle sensor information includes detected objects, road conditions, traffic conditions, traffic/driving information, etc. and provide Route and Traffic information discussed above. External vehicle sensors such as LiDAR, Radar, Cameras (i.e. imaging devices), etc. can be used to detect and identify objects such as obstructions on the road, other vehicles, pedestrians, and cyclists. Internal vehicle sensors measure vehicle states such as vehicle acceleration, speed, chassis roll, engine power, braking, steering, etc. Vehicle state refers to dynamic variables that capture changes in vehicle conditions including kinematics, motions, and dynamics of the vehicle (specifically the vehicle chassis, drivetrain, and vehicle cabin) subsystems. Sensors such as IMUs, accelerometers, encoders, potentiometers, etc. can be used to detect the various vehicle states. This information can be used for generating driving action commands (26), as well as generate PREACT Mechatronic subsystem commands (28). For example, if a pedestrian is detected in the path of the vehicle and it is determined that the vehicle will be braking in response, the PREACT algorithms can use this information to determine an appropriate response using its various PREACT Mechtronic Sub-systems to maximize passenger comfort and minimize motion sickness.

Historical Vehicle Sensor information includes historical/past data collected from the given vehicle and can include such data from other vehicles (with or without PREACT equipped) from previous trips. This is data collected prior to current vehicle trip or operation. Unlike current information which is specific the present point in time, historically aggregated vehicle sensor information is sourced from multiple vehicles simultaneously and shared with other vehicles through vehicle to vehicle communication, and through network communication with the data center. Not all historically aggregated data will be relevant, for example, it is unlikely that a pedestrian detected by a car in the past is at the same exact location however large scale trends such as traffic and pedestrian patterns can be extracted. Additionally, multiple vehicles may be on the same path or route, at different times. For example, a vehicle might detect traffic on a section of the route and slow down. This traffic information detected in real-time would be stored in the data center. If more vehicles continue to detect this traffic and slow down, this information would be aggregated by the data center (35, 62), and would inform the actions of another PREACT vehicle approaching that section of the route but has as yet not reached the traffic. In this way, historically aggregated information is a combination of raw data, filtered/processed data, and potentially data analytics/machine learning trends and insights. Machine learning and other computation can be onboard the vehicle or offboard as a part of the data center.

PREACT System Information (21, 22 in FIG. 6)

The PREACT System Information includes information regarding PREACT Algorithms (28-30), their outputs, and PREACT Mechatronic Subsystems (32). PREACT mechatronic subsystems (32) is a collection of subsystems that work independently or together to mitigate and/or eliminate the causes and symptoms of motion sickness (also known as kinetosis), or improve productivity, in any and all passengers (33) of the vehicles (current typical automobiles and autonomous vehicles of varying levels of autonomy). The PREACT Algorithms (28-30) takes in multiple sources of real-time information, and historically aggregated information from the data center (47, 51, 64), and uses information regarding passenger preferences and intelligence regarding the causes of motion sickness to devise optimal PREACT mechatronic actions/commands (50) that minimize motion sickness, improve comfort, and boost productivity. These command signals (50) are sent to PREACT mechatronic subsystems, and these preemptive commands are a combination of commands for current time as well as future times based on the PREACT system's current understanding and prediction of the passenger and vehicle states. These commands signals (49) are also sent to the data center to become a part of historically aggregated PREACT System command/interventions data. These commands (50) are received by the PREACT Mechatronic Subsystem (32). This mechatronic subsystem includes multiple subsystems such as an active seat, active restraint, active passenger stimuli, active productivity system. PREACT System Information also includes sensor and performance data from the mechatronic subsystem sensors. For example, for a particular passenger if it is noted that an active seat intervention produces favorable results over active passenger stimuli then the PREACT Command Generation Algorithm (28) will favor those interventions. Also, by combining information across multiple rides and multiple passengers, the system can learn the optimal commands to the system by analyzing the historical aggregated data. PREACT system information includes any parameters and dynamic variables that define the operational states of the PREACT Mechatronic subsystems. This includes sensor information from all hardware, all input and output signals of these subsystems.

While the commands (50) are described here to be preemptive, i.e. based on predictions made by various algorithms (25, 26, 27, 28), in some instances these commands may also contain a reactive component (e.g. a command or decision that is based on purely on prediction but also in response to what is measured in real-time).

Passenger Information (23, 24 in FIG. 6)

Passenger information captures passenger states as well as passenger parameters (including attributes, preferences, etc.). Passenger states refer to passenger physiological information, motion of the passenger's body, motion sickness level, comfort level, productivity level. Parameters include passenger preferences, passenger weight, height, motion sickness susceptibility, productivity task [FIG. 7 (67)], etc. Other examples of parameters include the passenger indicating through an interface (e.g. a user input or user interface) whether they are experiencing motion sickness and if so to what degree, or a change in productivity state (e.g. productivity level) at some point during the journey. Passenger states are dynamic variables which include the physiological condition of the passenger, bio-indicators (such as heart rate, perspiration), and movement of passengers (such as motions, movements, kinematics, and dynamics of passenger body/torso).

Real-time passenger information (60) is collected during the trip that reflects passenger states as a function of time measured in real time. Sensor information can provide information about passenger motions, kinematics, and dynamics as well as physiological states. Passenger dynamics motion state refers to the kinematics and dynamics of the passenger body in the autonomous vehicle. Physiological sensor information includes heart rate, breathing rate, sweating, etc. In-cabin cameras (i.e. imaging devices) can provide tracking of body segments through computer vision algorithms. Further, cameras can provide information about the task being performed by the passenger through human activity recognition software, consisting of computer vision and machine learning algorithms. Wearable devices, such as wristbands, can also be included to provide physiological and motion tracking data. An active display with passenger inputs can be used such that the passenger reports preferences as well as provide direct feedback about the level of comfort being experienced. IMU's can be mounted on the seat and on the passenger as to provide tracking of the passenger motion complimenting the camera image data processed through computer vision algorithms. Real-time passenger preference information includes real-time data regarding passenger preferences on PREACT mechatronic subsystem actions that influence motion sickness and productivity.

This above information can also be used to assess the productivity state of the passenger. Productivity assessment refers to a qualitative or quantitative assessment of the passenger productivity state made by the Passenger Model (30) (i.e. PREACT Prediction Algorithm) using real time and historical information from the data center (3000, 64), directly from the passenger (33, 60), and from PREACT Mechatronic Subsystems (32, 54). To accomplish this assessment the system can use productivity interface hardware & software, passenger sensors, vehicle cabin sensors, or some combination thereof. Examples include cameras that can identify a task, measure typing speed, measure of pages read per minute, etc. The assessment data (which is part of the passenger information data type) can be used to determine appropriate productivity improvement and motion sickness mitigation strategies. Productivity is inversely correlated with motion sickness, but also includes other factors, such as enhanced ability to execute a task. Examples include ability to rearrange in-vehicle seats, a VR system, an interactive display, etc. Different productive tasks may require different types and intensities of interventions. Productive tasks can include writing, reading, typing, and some combination of thereof. In addition, productive tasks can also include restful activities such as sleeping, meditation, etc. Such productive tasks will include not only the individual oriented tasks but also interactive tasks with other vehicle passengers such as business meetings, interactive gameplay, among others. A task ID (67) is a unique identifier assigned to unique productive tasks—this determination of which productive task is being performed can be made by the subsystem's sensors or user input. Through an analysis of aggregated data of all past trips across multiple vehicles and journeys, it is possible to infer trends on the passenger profile and categorize them based on preferences and sensor information. This allows the system to trace not only specific passenger information, but to collect data trends across passengers that share the same demographic in terms of motion sickness susceptibility. This allows for the creation of a personalized passenger profile and a trend among other passengers that share similar characteristics. Thus, motion sickness mitigation measures can be tailored such that passenger comfort is optimized.

Since the vehicle can be a conventional driver driven vehicle, an additional component of the passenger information (passenger states) can include driving styles and preferences of one or more passengers when they are the drivers (driving passenger) of the conventionally driven PREACT vehicle. The driving passenger may have their own unique style of steering the vehicle which can include a specific timing, rate, and amount of steering of the vehicle for a given route. For example, when making a right turn, one driver might like to start turning the wheel slower and earlier as opposed to another drive who might begin turning the wheel a little later, but faster. The driver may have their own unique style of accelerating and braking the vehicle when navigating a route which can include the timing, rate, and amount of acceleration and braking. For example, a driver might accelerate out of turn or complete stop at a higher rate than another. Additionally, a driving passenger might brake earlier and at a slower rate than a driving passenger who brakes more aggressively (i.e. brakes later, over a shorter period of time, but at a higher amount of braking). The driving style can also include the vehicle settings such as preferences for vehicle stability management, vehicle traction control, vehicle suspension stiffness, etc. For example, the driving style for a driving passenger can include their preference for a stiffer vehicle suspension and/or more aggressive traction control.

Vehicle Algorithms—Mid Level Computation (2000)

The Vehicle Algorithms form the Mid Level of the computational architecture for a vehicle equipped with the PREACT system. The mid level computation includes Prediction algorithms such as Predict Route & Navigation (25), and Vehicle Model (27). It also includes Command Generation algorithms such as Generate Driving Action Commands (26). The mid level computation includes PREACT Prediction algorithms such as PREACT Mechatronic Subsystem Models (29), and Passenger model (30). It also includes PREACT Preemption algorithms (or equivalently PREACT Command Generation algorithms) such as the Generate PREACT Mechatronic Subsystem Commands (28) algorithm. The Command Generation (including PREACT Preemption) algorithms are decision making algorithms that generate optimal commands (42, 50) to be sent to the low level computation/control of the various vehicle subsystems. Decision making and command generation capabilities are analogous in that decision making leads to command generation. For example, the Generate Driving Actions Commands (26) algorithm can make a decision to turn the car and generate the corresponding command to turn the car. These commands include both immediate/current and future commands (or predicted commands or simply predictions) and these commands are constantly updated in real time with new information and new predictions. In addition to decision making algorithms, the mid level computation also includes Prediction algorithms which represent models of physical systems such as the Traffic and Navigation model (25) to predict Route and Navigation, Vehicle model (27), PREACT Mechatronic System model (29), and Passenger model (30). These prediction algorithms or models predict the behavior of physical systems when executing commands generated by the decision making algorithms (26, 28); these commands include immediate or current and future predicted commands. For example, based on the commands generated by Generate Driving Actions Commands algorithm (26) the Vehicle Model (27) can predict the vehicle states and behavior of the vehicle due to the commands generated by the algorithms (26).

Prediction is defined as making a priori (probabilistic or deterministic) forecast about what will happen in the future; predictions include projections or forecasts which are predictions made in the time domain. The prediction algorithms attempt to align their predictions as close to reality as possible, and they use all available data to improve their predictive and command generation capability. Estimation is defined as using historical data and new information to estimate the parameters, settings, etc. Of an algorithm or model. Estimations are generally linked to the estimates of the past. The parameters are constantly updated (37, 40, 43, 47, 51, 64), and with every new data collected, the decision making algorithm and model parameters are iteratively improved and modified so that the predictions of these algorithms and models are as close to reality as possible.

These algorithms and computation can occur on board the PREACT vehicle or off board such as computation servers, computers, and other PREACT vehicles and the information can be communicated to the PREACT vehicle. The mid level computation is in constant communication with the other levels of the system architecture (Data Center and/or Vehicle Subsystems) so that the model estimations and predictions are as accurate and precise as possible. The physical models (i.e. Prediction and PREACT Prediction Algorithms) of the mid level computation are described as follows:

a. Vehicle Model (27): This is a model of the vehicle in which the PREACT system is installed. The model is used to estimate vehicle states for expected driving actions on a projected route. By estimating the vehicle states, the prediction of vehicle motion and its influence on passenger states can be estimated. For a specific car with a set of model parameters, the system can simulate how the car will interact with the environmental conditions given the anticipated driving actions of the vehicle. The dynamic variables associated with this model are received from the data center (43) and/or directly from the sensors installed in the vehicle (46) and/or from user input (60).
b. PREACT Mechatronic Subsystem Model (29): This is a model of the PREACT Mechatronic Subsystem (32) installed in the vehicle (31). This model is used to simulate the actions of the PREACT Mechatronic Subsystems such as Active Seat, Active Restraint, Active Passenger Stimuli, and Active Productivity Interface (mechatronic subsystem including hardware and software), and their influence on the passenger and vehicle (which are also modelled). This model includes relevant model parameters and dynamic variables that are received from the data center or directly from the sensors installed in the vehicle or from user input.

c. Passenger Model (30): This is a model of the passenger (33) seated in the PREACT equipped vehicle (31). The model is used to estimate the biomechanics and motion (e.g. movement of torso, limbs, head, tracking gaze, etc.), and physiological states of the passenger (e.g. heart rate, emotional state, motion sickness state, perspiration, comfort, etc.). The model parameters are obtained from user input (60), sensors in the vehicle (46), and any passenger profile information that might be stored in the data center (64).

d. Predict Route & Navigation (25): This algorithm predicts the route (or set of potential routes) that connects the origin point of the journey, and the destination of the journey. The passenger preferences for motion sickness and productivity, and vehicle fuel/energy consumption are estimated for each route and they are used to determine whether the given route is acceptable or not. In addition, using information available from the data center the algorithm can anticipate traffic conditions, and route and road conditions (e.g. construction, rough roads, safety hazards, etc.).

The decision making/command generation algorithms of the mid level computation are described as follows:

a. Generate Vehicle Driving Action Commands (26): This algorithm is used (if it's an autonomous vehicle or predicted based on past actions by the driver) to determine the actions that the vehicle will take to navigate a given route, traffic conditions, and road conditions. Additionally, this algorithm can account for passenger preferences (e.g. aggressiveness of acceleration and/or turning), and vehicle states (e.g. fuel/energy status, number of occupants, etc.) to determine and refine driving actions.

b. Generate PREACT Mechatronic Subsystem Commands (28): This algorithm determines the optimum actions or interventions that can be performed by the PREACT mechatronic subsystem (50) immediately, during current operation and preemptively (or feedforward) using information from the data center, user inputs, and predicted states by the above models and controllers. These actions are routinely The above algorithms are discussed in detail in the following sections.

Predict Route & Navigation (25)

Route and Navigation predictions refers to the selection of a path that connects the start and end points for a trip. The system uses the input start/end points and any available information regarding the vehicle environment (37) in order to generate multiple potential routes for the vehicle. The passenger (33) can use their personal electronic devices and/or any interface within the vehicle to convey pertinent information to the PREACT system (60). The data center logs this information (17, 18) and sends it (37) to the Generate Route and Navigation Commands (25) in addition to other information which might include vehicle information, and passenger information. The algorithm generates multiple route options that connect the start and end points for the trip—if an explicit end point has not been defined then the algorithm can attempt to predict the destination based on historical aggregated data (17, 19, 21, 23) from the data center. Once a set of possible routes has been identified, they are then assessed using multiple factors including (but not limited to) the time to reach the destination, the fuel/energy consumption and the expected vehicle and passenger states. Based on the assessment, the most optimum route is predicted and sent (38) to the Generate Driving Actions Commands (26) which sends the route and driving actions (42) to the Vehicle Drive & Steering Subsystems (31A). Other examples of route information include distance, travel time, type of road/path, location of traffic lights and stop signs, etc. In addition to the route which connected the start and end point of the journey, this algorithm also determines the navigation information which allows the algorithm to anticipate traffic conditions based on information from the data center (37). Other navigation information includes road closures, road conditions, traffic density, traffic light status, etc. In the event of a change of route at any point during the trip, this sequence is repeated for the new start and end points. All updated information is sent (38) to the Generate Driving Action Commands (26) algorithm, and to the data center (39). The predictions by this algorithm are reactive and preemptive—they include predicted route in real time and anticipated route in the future.

Generate Driving Action Commands (26 in FIG. 6)

Driving Action commands refers to the actions that the autonomous vehicle will take while navigating the route identified by (25). There are multiple ways that a vehicle can maneuver a given route; for example based on the passengers preferences the vehicle can choose to brake more softly or aggressively and make a turn at higher or lower speeds. The driving actions will rely on passenger preferences, vehicle and PREACT system information (40), and any driving action commands generated by the algorithm are sent to the data center (41) and sent to the vehicle drive subsystems (42). The driving actions are optimized by the algorithm to account for energy consumption and available energy, route and navigation, and passenger motion sickness and productivity states (i.e. productivity information). If the passenger (33) is engaged in a productive task then the passenger (33) can convey this information to the data center (60) or as determined by the PREACT Mechatronic Subsystems (54) the data center can be updated with passenger productivity information. The data center sends this information (40) to the Generate Driving Actions Commands (26) to influence the generated commands which will not compromise the passengers (33) productivity and reduce motion sickness. For example, if changing lanes before a turn is expected to decrease motion sickness resulting from the turn, the change of lane driving action can be generated and sent to the vehicle. This algorithm runs at all times and its commands are constantly updated with new information. The commands generated by this algorithm are reactive and preemptive (or predicted route and navigation commands).

Vehicle Model (27 in FIG. 6)

A model of the vehicle is used to predict the vehicle states for given driving action commands (65) for a particular route (38). The model is used to predict the vehicle states, which includes the dynamic behavior of the vehicle, its energy consumption, and its influence on the passenger (and thereby the passenger states) seated in the vehicle. The model can be deterministic and/or stochastic, and it will include a set of model parameters for a specific car. The goal of the model is to accurately predict the vehicle states for a given vehicle—the model parameters are continually estimated and improved (43) using new information from the data center. Examples of vehicle parameters include suspension stiffness, motor power, car weight, real time vehicle states, and historical vehicle information, among others. The model predicted vehicle states are sent to the data center (45)

and compared against actual sensor information from the vehicle drive subsystems (46), and based on this comparison, the updated model parameters are estimated and sent to the vehicle model algorithm (43). This algorithm performs computations continuously at all times, and its predictions are updated with new information.

Generate PREACT Mechatronic Subsystem Commands (28 in FIG. 6)

This algorithm is a PREACT Mechatronic Subsystem Commands are actions that the PREACT Mechatronic Subsystem can perform to mitigate motion sickness, and boost the passengers productivity. Multiple factors influence the performance of this algorithm including the expected motion of vehicle (i.e. predicted vehicle states) (44), all real time and historical information from the data center (47), real time motion of the vehicle and vehicle drive subsystems (56), and passenger preferences, inputs, and profile (60). For example, it's known a priori that tilting the seat to counteract the inertial forces resulting from a turn reduces motion sickness, so this information can be used to command the active seat when motion sickness is anticipated. However the exact nature of the tilting, timing, and other factors can be predicted and be customized to the individual requirements of a specific passenger. The algorithm generates commands that are real time and predictions (preemptive actions for the future) for the future. The commands generated by the algorithm are modelled by the PREACT Mechatronic Subsystem model (29) and their expected influence on the passenger are modelled by the Passenger model (30). The commands are optimized based on multiple factors including amount of energy required and available, and passenger profile & preferences. Any information regarding the PREACT Mechatronic Subsystem Commands is sent to the data center (49), and combined with information from the PREACT Mechatronic Subsystems (32) sent to the data center (54) and passenger inputs (60) the algorithm and its predictions are improved. All updated information is sent (48) to the PREACT Mechatronic Subsystem Model (29), to the data center (49), and sent (50) to the PREACT Mechatronic subsystems (32). The commands generated by this algorithm are reactive and preemptive (or predicted route and navigation commands)—both real time and anticipated commands for the future.

PREACT Mechatronic Subsystem Model (29 in FIG. 6)

The PREACT Mechatronic Subsystem model is an algorithm that models the physical PREACT Mechatronic Subsystem which includes the Active Seat, Active Restraint, Active Passenger Stimuli, and Active Productivity Interface. By creating a dynamic model of each of these systems and how they interact, it is possible to predict the state of the PREACT hardware at any point in the trip given a set of driving actions. The model can be deterministic and/or stochastic, and it will include a set of model parameters for a specific PREACT mechatronic subsystem implementation. The goal of the model is to accurately predict the PREACT Mechatronic Subsystem states for a given vehicle—the model parameters are continually estimated and improved (47) using new information from the data center, and from the actual PREACT Mechatronic Subsystems (54). These models are informed by the mechatronic subsystem parameters, such as active seat suspension stiffness, cabin lighting positioning, active restraint configuration, among others. The PREACT mechatronic subsystem actions can be targeted to modify the passenger motion dynamics (active seat and restraint), the cabin conditions (temperature, lighting and display) and active passenger dynamics (haptic and display). This process is done continuously at all times in order to find the optimum PREACT mechatronic subsystem actions for all anticipated driving actions. This algorithm performs computations continuously at all times, and its predictions are updated with new information.

Passenger Model (30 in FIG. 6)

A model of the passenger is used to predict passenger states for given PREACT Mechatronic subsystem commands (52) and with information from the data center (64). The model can be deterministic and/or stochastic, and it will include a set of model parameters for a specific passenger. The passenger parameters includes their gender, age, weight, height, motion sickness susceptibility, productivity preferences, etc. The passenger dynamic variables includes their motion states (position and orientation of their head), task being performed, their motion sickness state, etc. The passenger motion dynamics are calculated using a biomechanics model. The estimated passenger motion can be used as an input to a motion sickness estimation model and a productivity assessment model. This process is done continuously in order to find the passenger states for all anticipated driving actions. In addition to data from the data center (64) and data from other algorithms in the mid level computation (52), real time information of the PREACT Mechatronic Subsystem (57) and the passenger (60) is used to optimize the model and ensure that its predictions are as close to reality as possible. This algorithm performs computations continuously at all times, and its predictions are updated with new information. The estimated passenger states and model inputs are continually sent to the data center (55).

Low Level Computation (1000)

At the Low Level (1000) of the computational architecture of FIG. 6, there are several Vehicle Subsystems. These Vehicle Subsystems include the Vehicle Drive Subsystems (31A), Other Vehicle Subsystems (31B), and PREACT Mechatronic Subsystems (32). The computation that happens within and the level of these Vehicle Subsystems represents the Low Level (1000) computation within the computational architecture of FIG. 6. There are various sensors that are part of Vehicle Subsystems including the PREACT mechatronic subsystem, measure the Vehicle Subsystem data (including state). These measurements are used for the Low Level control/computation of the PREACT mechatronic subsystems. This data/information is also sent to the mid (56, 57) and high (46, 54, 60) level computation for decision making and data storage. The data on the passenger is collected by wearable sensors or other sensors within the vehicle (e.g. cameras, motion detectors, proximity sensors, non-contact thermometers) that track the passenger states. The real time data from the low level of computation is also used to improve the algorithms in the mid level computation to ensure prediction accuracy. The PREACT Mechatronic Subsystems are described in detail below.

a. Active Restraint (5, FIG. 4): The active restraint is mechatronic subsystem that restrains the passenger such that they have no relative motion with respect to the vehicle seat (active seat). This function will require changing the length of the restraint or some other means of varying the restraint force that is applied on the passenger. The active restraint will be equipped with sensors that measure the motion states of the active restraint.

b. Active Seat (3, FIG. 4): The active seat is mechatronic subsystem that allows for motion of the vehicle seat with respect to the chassis of the vehicle. This motion can include rotations, translations, or any combination of the above. The motion of the active seat is controlled by the mid level computation algorithms, and by user input. The active seat will be equipped with sensors (e.g. IMU, encoders) that measure the motion states of the active seat (e.g. angle of rotation, angular velocity, acceleration, position).

c. Active Passenger Stimuli (6, FIG. 4): The passenger can be given certain stimuli to trigger predetermined actions or motion of the passenger—these stimuli that trigger active actions of the passenger are active passenger stimuli. The stimuli can be in the form of audio, light, and touch (e.g. haptic, vibration, puff of air, etc.). These can be customized to suit particular passengers preferences.

d. Active Productivity Interface (7, FIG. 4): The productivity interface includes a display screen, touch screen, keyboard or interaction buttons, an active table or work surface, or some combination thereof. Based on the task ID the system makes a determination to activate all or some combination of the productivity interface to boost the passengers productivity, and aid in the performance of the task.

In addition to the PREACT Mechatronic Subsystems, the PREACT Preemption Algorithms (10B in FIG. 4, 28 in FIG. 6) can also influence conceivably any Vehicle Subsystem that can be controlled, and is not restricted to any previously identified Vehicle Drive (31A) and PREACT Mechatronic Subsystems (32). For example, the mid level computation can command and control (reactively and preemptively) the Vehicle Cabin Environment (71, FIG. 7). The Vehicle Cabin Environment (71, FIG. 7) includes air conditioning, lighting, and audio components of the vehicle. The temperature, airflow, amount and direction of lighting, and types of sounds and music can impact the comfort, and productivity of the passenger. The Vehicle Cabin Environment (71, FIG. 7) can be controlled in coordination with all other vehicle subsystems within the low level computation of the architecture. The PREACT Preemption Algorithms (10B) or Generate PREACT Mechatronic Subsystem Commands Algorithm (28) can conceivable control (reactively and preemptively) any vehicle subsystem that exists in vehicles currently or can be added later. For example, if a new vehicle subsystem (73, FIG. 7) is invented or added to the vehicle (e.g. as an aftermarket addition) after the vehicle is manufactured this vehicle subsystem can be controlled by the PREACT Algorithms. The PREACT Mechatronic Subsystems are described in detail below.

Active Restraint (5 in FIG. 4)

The active restraint subsystem is mechatronic subsystem that restrains the passenger to the vehicle seat (e.g. active seat). The type of restraint can vary and be a multipoint, 3 point, lap restraint, or some combination thereof. The restraint strap is attached to an actuator which can be controlled—by varying the length of the strap the tension of the restraint (i.e. restraining force) can be modulated. By modulating the restraining force, the passenger can be leaned into the direction of the turn or lean back towards the seat when the vehicle is braking. Leaning of the passenger includes leaning of passenger's torso, head, neck, or other limbs. The active restraint may use sensors that track the position and tension (i.e. restraining force) of the strap. In addition, passenger preferences and input can control the behavior of the active restraint to meet the individual comfort, productivity, and motion sickness needs. The data from passenger inputs, and active restraint sensors is sent to the data center (54), and used by the mid level control algorithms. The active restraint parameters include number and location of anchor points, power of the actuator, width and stiffness of the restraint (e.g strap), etc. The active restraint dynamic variables include the length of the restraint, the tension of the restraint, state of the restraint latch, etc.

Figure 8:
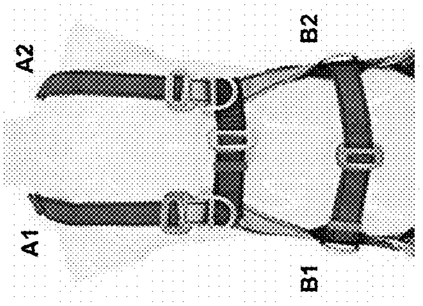
FIG. 8 shows an exemplary Active Restraint Sub-System

This Active Restraint can involve a variety of hard or soft or hybrid braces, restraints, harnesses, and seat-belts. One example of a multiple anchor point harness (i.e. seat belt) for a front facing passenger is shown in FIG. 8. The ends A1, A2, B1, B2 are all active, i.e. can be pulled into the seat, via appropriate actuators, thereby tightening certain sections of the seat belt selectively. In one instance, as the vehicle brakes (i.e. decelerates), the segments A1 and A2 will preemptively be activated/actuated/pulled in thereby bracing the passenger by holding them back in anticipation of the forward lunge motion that happens when the vehicle actually decelerates. Or if the vehicle is predicted to take a right turn, the seat-belt segments A2 and B2 of the Active Restraint System will be preemptively activated/actuated/pulled in, to pull or restrain the passenger into the direction of turn in anticipation of and to mitigate the effect of the passenger getting shoved away from the turning direction due to centrifugal effect.

Additional elements of an Active Restraint Sub-System may include a neck support or head rest, with active features that can preemptively bias the passenger's head/neck in one direction or the other in anticipation of an acceleration or deceleration event.

Active Seat (3 in FIG. 4)

The active seat is the vehicle seat on which the passenger (s) (33) of the vehicle is seated or supported. The active seat provides relative motion between the seat and the chassis of the vehicle. This motion can include rotation (e.g. pitch, roll, yaw), translation (e.g. heave, sway, surge), or some combination thereof. The active seat and active restraint are compatible with each other such that the passenger is comfortably restrained and seated in the active seat and the passenger does not have significant relative motion between themselves and the seat. The motion of the active seat can be controlled by actuators (e.g. motors, pneumatic, hydraulic etc) and measured by sensors (e.g. encoders, IMUs, force and torque sensors, etc.). The motion of the active seat can be activated by the commands from the mid level computation algorithms and controlled (i.e. command following) by the low level computation. As part of passenger information, specifically passenger preferences, the passenger can choose the intensity of the active seat motion. Depending on their preferences the PREACT Preemption Algorithm can reduce or increase the range of motion, speed, acceleration, etc. in the preemptive commands (50) sent to the active seat. The data from the sensors of the active seat are sent to the data center through some network communication. The active seat can also move to allow passengers within the vehicle to face each other for meetings, discussion, and/or other productive activities. The active seat can include embedded sensors that measure the passenger states which include any physiological information and motion information. The active seat parameters include the length, height, breadth of the seat, the range of motion of the active seat, the type and power of the actuator, etc. The active seat dynamic variables (i.e. states) include the amount of tip, tilt or any other motion, the speed and acceleration of the motion, and any information that is measured by the sensors.

Active Passenger Stimuli (6 in FIG. 4)

The passenger can be given certain stimuli to trigger desirable actions or motion of the passenger—these stimuli that trigger active actions of the passenger are active passenger stimuli. The stimuli can be in the form of audio, light, and touch (e.g. haptic, vibration, puff of air, etc.). The stimuli can be a single type or a combination of the stimuli options. The specific combination of active passenger stimuli may be customized by the "Generate PREACT Mechatronic Subsystem Commands" algorithm (28) for each passenger based on passenger information (e.g. susceptibility, sensitivity, or preferences of the passenger).

The audio stimuli can be provided by audio components in the vehicle cabin (e.g. dedicated speakers and/or speakers of the vehicles entertainment system) and by the passengers personal devices (e.g. laptops, smartphones, smartwatch, tablets, etc.). The audio stimuli can be different types of sounds (e.g. beeps or trills, etc.) and/or melodies and music. The purpose of the audio stimuli is to trigger a desirable response of the passenger. For example, if the vehicle is about to make a right turn, a speaker on the right side of the vehicle cabin can beep causing the passenger to turn their head in the direction of the sound. In another example, if the vehicle is about to turn left, the passenger can lean (e.g. their head, torso, whole body, or other limbs) in the direction of the turn. The light stimuli can be provided by lights and display components in the vehicle cabin and by the passengers personal devices. The purpose of the light stimuli is to trigger a predictable/desirable response of the passenger. For example, if the vehicle is about to come to a stop, the lights in the vehicle can flash red which the passengers can interpret as the vehicle decelerating, and use that information to brace themselves. The haptic stimuli can be provided by devices embedded in the active seat, active restraint, passengers personal devices, passenger clothing/attire (e.g. neck collar, headband, wrist band, etc.) or by dedicated haptic devices in the vehicle cabin. For example, if the vehicle is about to make a left turn the haptic device in the active seat can trigger vibrations that can be sensed by the passengers left leg, and this vibration can be interpreted by the passenger to prepare themselves for the vehicle turning left. In addition to haptic devices, sensory stimuli can be provided by the air conditioning by sending directional puffs of air. The actions of the active passenger stimuli, passenger response and preferences, and any related sensor information is sent to the mid level control algorithms and to the data center to influence future actions.

Active Productivity Interface (7 in FIG. 4)

Figure 9:
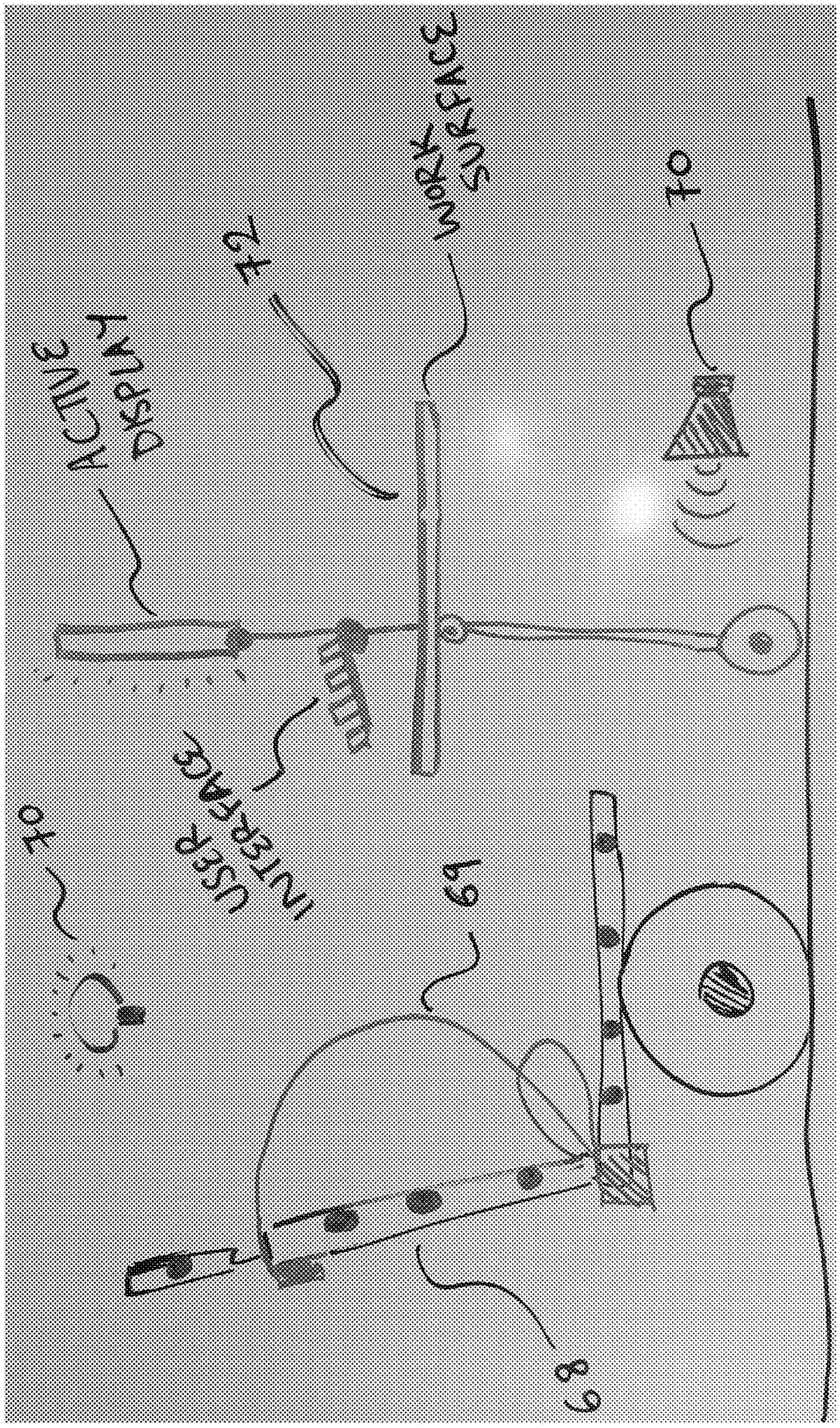
FIG. 9 shows an exemplary Active Productivity Interface
Figure 10:
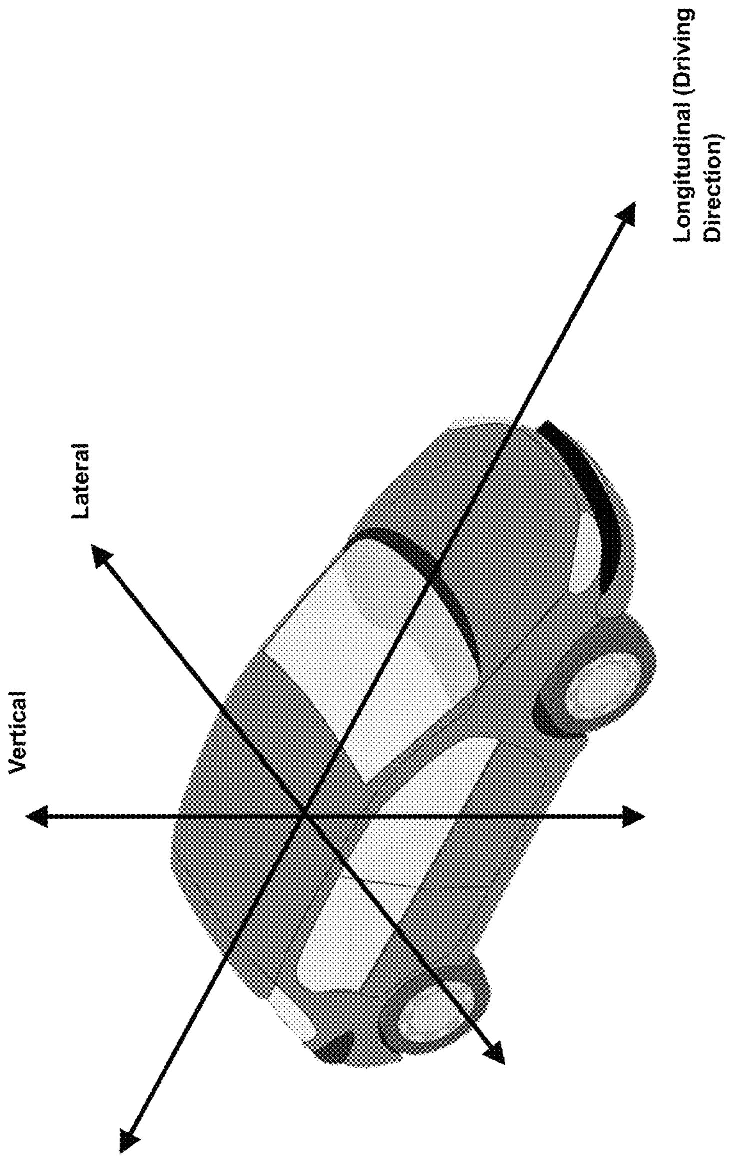
FIG. 10 shows the longitudinal (i.e. driving direction), lateral and vertical directions, as commonly understood, for a passenger vehicle.

The active productivity interface works in combination with the other active subsystems part of the PREACT system. When the system determines or the passenger indicates that they are performing a task whose task ID (67, FIG. 7) triggers the active productivity interface. For example, if a passenger is reading a book, the system or the passenger themselves can indicate that they are performing this activity, the system recognizes the task through its task ID (67, FIG. 7) and triggers appropriate actions of the active productivity interface. For certain task IDs (67, FIG. 7), only the active seat, active restraint, active cabin environment, and active passenger stimuli interventions are triggered whereas for other task ID which correspond to the passenger performing productive tasks, the active productivity interface can also be triggered. In one embodiment, the productivity interface can consist of the following components: (1) active display, (2) active work surface, and (3) active user-input/keyboard (FIG. 9). The active display is a display that the passenger uses to perform productive activities. The display position (and motion) can be controlled (33) by the passenger (60) and/or by the Generate PREACT mechatronic subsystem commands (28). This display can perform multiple roles such as being a touch screen which can be used for both user input and to display information. The display can actively move (i.e. be commanded/controlled) such that the passenger can continue to engage in productive activity in spite of the motion of the vehicle. Also if the passenger moves within the cabin of the vehicle the active display can reorient itself to be easily accessible to the passenger. Sensors in the vehicle cabin (including cameras) can determine the passengers orientation and gaze, and use that to reposition the active display. The active work surface is a table-like device which can be used by the passenger if they are writing, sketching, or performing any activity that requires them to lean their hands on a table while seated inside the vehicle. The work surface is compatible with the user input and active display components. It may also be physically attached to one or both of those components. The work surface can actively move (i.e. be commanded/controlled/adjusted) such that the passenger can continue to engage in productive activity in spite of the motion of the vehicle. The user input is a keyboard type device that has buttons, touch screens, sketch pads, or any other type of user input device that allows the passenger to convey some intent or action to the computer. The actions of the active productivity interface, and any sensor data associated with the components is sent to the mid level control algorithms and to the data center to influence future actions. The parameters of the active productivity interface include the physical dimensions of the display, work surface, user interface/keyboard, range of motion of the display, work surface, etc. The dynamic variables of the active productivity interface include the actual motion (position, speed) of display, work surface, and keyboard, display states of the display (brightness, colors), the keyboard/user interface states, etc.

Vehicle Cabin Environment (71 in FIG. 7)

The active cabin environment refers to the environment of the vehicle cabin that the passenger is seated in. The cabin environment includes multiple factors that constitute the ambience of the vehicle cabin which includes heating and air conditioning, lighting and visual displays, and audio components of the vehicle. By actively controlling and modulating the above, the comfort, productivity, and motion sickness of the passenger can be influenced.

The heating and air conditioning system helps control the temperature in the vehicle cabin, by varying the temperature of the air, direction of airflow, and speed of air flow. In addition, the air conditioning system can also introduce a scent in the air flow to create a pleasant aroma. The air can also be filtered to reduce particles and other foreign matter from the air to clean it. The lighting and visual display system helps display information for the passengers, and control the ambient lighting. The amount of lighting can be controlled by varying which lights are switched on and by controlling the intensity of the lights. The displays can be used to provide pertinent information to the passenger. The amount of light and information that may be available to the passenger can influence their comfort and productivity. The audio system controls the sounds and auditory ambience of the vehicle cabin. This can include the type and volume of the sound. This also includes the entertainment system which plays music and other sounds and personal devices of the passengers (e.g. laptops, smartphone, smartwatch, tablets, etc.). The system can leverage lights, displays, and audio devices in the vehicle, and personal electronic devices that belong to the passenger (e.g. laptops, tablets, smartphones, etc.) by connecting and communicating with the personal devices through wireless network communication (e.g. WiFi, Bluetooth, NFC, etc.) or through wired connections. The operating conditions of the active cabin environment can be sent to the data center to be stored for future use.

PREACT System Description During Operation

The PREACT System (at all levels of computation) is now described while in operation in a vehicle. This description combines the operations and functions of the various levels of computation of the PREACT architecture and how they come together to mitigate motion sickness and boost the productivity of the passenger. The detailed description is presented chronologically and is split into three phases: (1) before the journey has begun and before the vehicle is moving, (2) during the journey, at any time after the commencement of the journey and before its conclusion, and (3) after the journey is concluded and the car has stopped moving. This description is presented in the context of an autonomous vehicle (AV), but is relevant to any passenger ground vehicle that may be manually driven or have any varying level of autonomy.

Before Journey—Before Driving has Begun

Before the journey has begun, the AV is likely stationary and Vehicle Drive Subsystems (31A) are likely partially powered off. For example, it is unlikely that the engine of the autonomous vehicle is powered. Other Vehicle Subsystems such as the PREACT Mechatronic Subsystems (32) can continue to operate and perform computations, and exchange information (42, 50, 56, 57) with the mid level computation and send information (46, 54, 60) to the high level computation. To maintain communication with all levels of computation, any data communication method described earlier can be used (wired communication such as cable and fiber, and wireless communication cellular, wireless, satellite, microwave, radio frequency, LAN, bluetooth, WAN, etc.). In addition the passenger's electronic devices (e.g. smartphone, smartwatch, or other mobile device, or other wearable device) may also be used to collect and transmit information (60). The passenger (33) can use these devices to provide information regarding the upcoming journey which can include information regarding any data type (e.g. vehicle, passenger, route & traffic, and PREACT system information).

If the passenger (33) does not have a passenger profile, which is part of the passenger information (23, 24) in the data center, they can use their electronic devices and/or electronics devices in the vehicle and/or the necessary information can be extracted from the passengers social media or other accounts (61) to build their passenger profile. For example, the passengers parameters such as gender, age, height, and weight can be extracted from their social media or fitness tracking application (with proper permissions). Also, if the passenger has travelled in other vehicles (35) or shares characteristics (e.g. motion sickness susceptibility, gender, age, productivity preferences, etc.) with other passengers in other vehicles (35) then that information can also be used (62) by the data center to build the passenger profile (23, 24). Information such as susceptibility to motion sickness and the passengers (33) preferences for PREACT Mechatronic Subsystem (29, 32) actions can be determined via surveys and then continued passenger feedback (60) accumulated over multiple journeys in the PREACT vehicle. For example, a passenger (33) can use their personal electronic devices and/or any interface within the vehicle to indicate their motion sickness susceptibility, their preference for PREACT mechatronic subsystem actions. These preferences can include the intensity, timing, and amount of sub-system actions (e.g. motion of active seat subsystem). Information regarding additional passengers and/or any other cargo that the PREACT vehicle may be carrying can also be communicated to the data center.

Even before the journey has begun, computation may be occurring at all levels of the system architecture. For example, at mid level computation the algorithm to determine route and navigation (25) can be constantly updating its outputs based on new information from the data center (37). Using information regarding the PREACT vehicle (43, 46) the mid level computation can optimize the command generation algorithms (25, 26, 28). For example, based on the information regarding the route and traffic (37) such as distance and duration, and the vehicle such as maximum available power/energy (40, 43, 47, 51, 64) for PREACT Mechatronic Subsystem Commands of the mid level computation algorithms can suitably alter their output commands (48) such that they maximize effectiveness while minimizing power consumption. This computation can also be used to notify the passengers of pertinent information. For example, if the vehicle does not have enough energy/power to complete the journey then the data center can inform (60) the passenger (33) via their personal electronic devices or interfaces in the vehicle (33) that the vehicle requires more energy/power. The passenger (33) may or may not explicitly provide the data center and/or vehicle algorithms with a starting location and a destination for the journey however the Predict route & navigation (25) algorithm can determine this information using the various sensors and other sources of information (37) it has access to. For example, the data center can use information from the GPS sensor from the vehicle drive subsystems (31) to detect the current location of the PREACT vehicle which is likely the start location for the journey. The algorithm to predict the route and navigation (25) can also use historical information (17, 19, 23) to determine likely destinations based on past trips of the passenger given the day, time, and other factors. The algorithm can also use up to date information on route and traffic (18, 37), combined with historical trends (17) to predict traffic and optimum route (38) for an upcoming trip.

Even before the journey has begun and the vehicle is moving, computation can be occurring at all levels of computation in the system architecture. These computations can be used to inform the actions of the PREACT vehicle (primary vehicle) but also other PREACT vehicles that might be on the road that are in the vicinity of the primary vehicle. For example, if a PREACT vehicle (primary vehicle) is parked by the side of the road, its onboard sensors (31A, 31B) and computers can still provide information to the mid level (56) and high level (46) computation which can use this information and computation to inform the actions (42, 50) of the other PREACT vehicles. The vehicle subsystems (low level computation) of a primary vehicle can be used to assist other PREACT vehicles in the vicinity. For example, if a PREACT vehicle (primary vehicle) is on a journey but has lost communication with the data center or vehicle algorithms, then the vehicle can use V2V or V2I communication to communicate with another PREACT vehicle in the vicinity to maintain the communication link with the data center and vehicle algorithms. Once the passengers enter the vehicle and the vehicle begins to move, the journey begins and this phase of the journey is described in the next section.

During Journey—while Driving

The passenger or passengers are now seated in the PREACT vehicle and the journey has begun. The vehicle drive subsystems (31A) implement the driving actions commands (42) generated by the generate driving actions commands (26) for a given route (38) predicted by the predict route and navigation algorithm (25). The algorithms (25, 26) will receive up to date real time information and historical information (37, 40) from the data center. This information includes route and traffic information (17, 18), vehicle information (19, 20), PREACT system information (21, 22), and passenger information (23, 24). The driving action commands are sent (65) to the vehicle model (27) in addition to being sent (42) to the vehicle drive subsystems (31) and to the data center (41). The vehicle model is updated and kept up to date with new information from the data center (43) and this model is used to predict the vehicle states. These model predicted vehicle states are sent to the data center (45) along with real time vehicle states (46) from vehicle drive subsystems (31); and both these data are used to ensure that the vehicle model predictions are close to reality by estimating the improved vehicle model parameters. The predicted vehicle states are sent (44) to the Generate PREACT Mechatronic subsystem commands algorithm (28). The generate PREACT Mechatronic subsystem commands algorithm (28) uses model predicted vehicle states (44), real time vehicle states (56), and information from the data center (47) which includes historical and real time information regarding the passenger preferences (23, 24), PREACT system information (21, 22), etc. The algorithm predicted PREACT Mechatronic Subsystem commands are sent to (48) the PREACT mechatronic subsystem model (29) which predicts the mechatronic subsystem states. The mechatronic subsystem model (29) is continually improved with new information from the data center (51) as it continually estimates and improves the model parameters for more accurate predictions. The mechatronic subsystem model (29) predicted states are sent to the data center (53) to add to the information collected by the data center (21, 22). The mechatronic subsystem model (29) predicted states are sent (52) to the Passenger model (30). The passenger model (30) represents the physical and physiological characteristics of the passenger (33) in the autonomous vehicle. The Passenger model (30) predicts the passenger states (e.g. motion sickness, comfort, productivity, dynamics, motion, etc.) of the passenger for a given route & navigation (38), driving actions (65), and PREACT mechatronic subsystem actions (48). The passenger model (30) is continually improved with new information from the data center (64), real time information from the passenger (60, 64), and real time sensor information from the vehicle subsystems (57). The model (30) predicted passenger states are sent to the data center (55) to become a part of the data centers passenger information (23, 24). Information from the vehicle algorithms (39, 41, 45, 49, 53, 55) and vehicle subsystems (46, 54, 60) becomes a part of the data center information (17-24).

Once the vehicle algorithms have optimized their commands, these commands are sent to the vehicle subsystems (42, 50). The optimized real time and predicted commands generated by the route & navigation (25, 38), and driving actions algorithms (26, 65) are sent (42) to the vehicle drive subsystems (31A). The vehicle drive & steering subsystems states (31A) are sent to (58) to the PREACT Mechatronic subsystems (32). The PREACT mechatronic subsystem (32) uses the information from the vehicle drive subsystems (58) and commands from the PREACT Preemption algorithms (50) and implements the commands. The mechatronic subsystem (32) performs actions (59) that influence the passenger (33). For example, the active seat subsystem (which is part of the PREACT mechatronic subsystem (32)) can tip and tilt based on commands from the PREACT preemption algorithms (50) and information from the vehicle drive subsystems (58), and this will influence the position, comfort, and other passenger states of the passenger (33) in the vehicle. The passenger (33) can use the interface within the vehicle and their own personal electronic devices to communicate with the vehicle algorithms and data center (60) to convey their preferences and/or modulate the actions of the vehicle algorithms.

The route and traffic information (17, 18) is being constantly updated as new information is gathered from the sensors in the vehicle subsystems (46, 54, 60), information from other PREACT and non PREACT vehicles (35, 62), infrastructure sensors (36, 63), and other databases (34, 61). At any given instant of time as the journey is ongoing, the vehicle may be moving or be temporarily stationary such as at a stop sign, traffic light, etc. Using the best possible information (37, 40, 43, 47, 51, 56, 57, 64), the mid level computation is able to predict the optimum route and traffic conditions for the journey (25, 38). From time to time, as new information is found the route can be altered. For example, if new information from other vehicles (62) or infrastructure sensors (63) indicates that the traffic situation has changed along the route, the vehicle can alter the route (38) it takes to avoid the increased traffic. Multiple data streams can influence the determination of the route at mid level computation, including but not limited to, passenger preferences (23, 24) for travel time and routes (e.g. avoid highways or side streets), motion sickness mitigation preferences (21, 22) (e.g. a route with more curves and/or start and stops will cause more motion sickness), productivity preferences (e.g. bumpy roads will make it harder to perform productive tasks such as reading or typing on a keyboard). Similarly, the determination of vehicle actions (26, 40) can also be influenced by the above data streams. For example, if the passenger prefers strong motion sickness mitigation interventions as they are highly susceptible to motion sickness, the vehicle actions (26, 40) can reduce the severity of the acceleration, braking, and steering of the vehicle for a given route. The determination of the PREACT actions (28, 48) for a given route (38) and passengers (33) are optimized and projected for the entire duration of the trip.

At every instant of time, with new and improved information, the determination of PREACT mechatronic subsystem actions (28, 48) for the future improves. By combining the real time and predicted future actions the PREACT mechatronic subsystem (32) can blend and combine the actions so that they smoothly transition from one command to the other. For example, if the vehicle algorithms (25, 26, 28) know that a left turn is forthcoming, the active seat subsystem (which is a part of the PREACT Mechatronic Subsystem (32)) can start tilting towards the turn slowly well before the turn arrives—the motion can be slow and smooth such that it causes minimum disturbance to the passenger (33) and allows the passenger (33) to acclimatize to the tilt/motion of the active seat (32). Similarly, if the productivity interface subsystem (32) is aware that the passenger (33) is in a video conference meeting, and the active seat (32) will be tilting/moving to account for the vehicle turning, the camera and display of the productivity interface subsystem (32) can move in unison thereby reducing the disruption to the passengers (33) productive tasks and still mitigating motion sickness.

The various PREACT mechatronic subsystems (32) can also work in tandem to accomplish the optimum motion sickness and productivity passenger states. For example, while driving on rough, rough roads while the vehicle may roll from side to side intermittently, instead of the active seat (32) tilting continuously, the optimum action might be to simply tighten the active restraint (32) to hold the passengers (33) body more snuggly into the seat—and this might help the passenger (33) be more comfortable than just the active seat by itself. Similarly, if the vehicle is changing lanes, the PREACT active passenger stimuli subsystem (32) might inform the passenger (33) of the lane change, and along with the active seat and active restraint, mitigate motion sickness. The PREACT System must be robust to sudden and unexpected changes to the route & traffic (17, 18), vehicle (19, 20), PREACT mechatronic subsystem (21, 22), and passenger states and information (23, 24). This is why data flows between all levels of computation, and even in the absence of real time data, using historical data and trends, best guesses and predictions can be made to ensure optimum or close to optimum system performance. For example, if no real time information is available on route and traffic (18) due to any reason (e.g. communication failure, lack of sensors, etc.) the mid level computation can call upon all relevant historical data (17, 19, 21, 23) from the data center and use this to make predictions and estimations for real time states. This prediction and estimation can then be used not only to determine commands/actions in the future, but in case no or only partial real time information is available, the prediction and preemption algorithms (25-30) can also attempt to predict current and future states and take preemptive actions. Since all levels of computation rely on large volumes of data, an additional challenge can be dealing with incorrect or out of date data that cannot be corroborated with any historical data or past trends. For example, while the PREACT vehicle is in motion during its journey, an accident can occur quite suddenly which may not involve the PREACT vehicle directly but it will still impact the driving actions (65), route (38), and passenger response (60). The accident may quite suddenly change the traffic conditions along the route (38), and can also require a change of route due to road closures. For such sudden events, the PREACT vehicle may not have any preemptive knowledge and will have to respond in real time. However, other PREACT vehicles which might be couple seconds, minutes, or hours behind the PREACT vehicle that first witnessed the accident (and thereby logged the data associated with the accident (46), and shared it with all levels of computation including the data center) can be informed of the change in their route (38) and navigation by the data center. Another example of a sudden event is the PREACT vehicle having a tire blowout or suddenly losing pressure in one or two of its tires—this sudden change cannot be predicted or known preemptively however it will influence the driving actions (65, 42), and PREACT subsystem actions (48, 50).

In some cases, sensor collected information (46, 54, 56, 57) can be limiting, and passengers (33) may have to self-report new information or data to all levels of computation. For example, even though the PREACT mechatronic subsystem (32, 59) may be monitoring the passenger (33) states using various sensors and cameras (i.e. imaging devices) the data captured by the sensors may not fully and accurately reflect the actual passenger states. In this scenario, the passenger (33) can self-report any information (60) such as their current comfort levels (i.e. comfort states), updated preferences for motion sickness mitigation and/or productivity interventions, etc. At any time during the journey, the passenger (33) can use their electronic devices or any interface within the vehicle to control and modulate the PREACT mechatronic subsystem (32, 50) actions. These on the fly changes and indication of preferences represent the individual and customized requirements of the passenger (33), and these changes augment the passenger profile that is saved in the data center as part of the passenger information data stream (23, 24). Especially for the productivity interface (32), the passenger (33) can customize the productivity interface to suit their own work styles—for example, if the passenger (33) is likely going to read during their morning commute, the productivity interface (part of 32, PREACT Mechatronic Subsystem) can prioritize reading tasks for that particular passenger (33).

The above described system behavior holds in all types of driving which includes urban, highway, and even off road driving. The journey ends when the vehicle reaches its destination.

After Journey—After Driving has Concluded

Once the journey is concluded, the vehicle has reached its destination. The data collected over this journey is sent to the data center (46, 54, 60) to be stored and becomes part of the historical data in the data center (17, 19, 21, 23). The stationary PREACT vehicle can continue to provide computation support to other vehicles in the vicinity, and also provide any sensor information that it can gather from its surroundings. With every journey, the mid level computation improves its prediction and estimation ability.

PREACT Algorithms Detailed Description

The PREACT Preemption Algorithm (FIG. 4 Block 10B) consists of the Generate PREACT Mechatronic Subsystem Commands algorithm (FIG. 6, 28). The PREACT Prediction Algorithm (FIG. 4 Block 10A) consists of PREACT Mechatronic Subsystem Model (FIG. 6, 29), and the Passenger Model (FIG. 6, 30). These algorithms are prediction or preemptive control algorithms, and their embodiments are described in detail below. More specifically, the Generate PREACT Mechatronic Subsystem Commands Algorithm (28) is a preemptive control or preemption algorithm whereas the Passenger Model (30) and PREACT Mechatronic Subsystem Model (29) is a prediction algorithm.

Passenger Model Algorithms (30)

The following algorithms are predictive in nature—in that they predict a future passenger state using models of the passenger. There are five predictions made by the passenger model: (1) Motion Sickness Susceptibility of the Passenger, (2) Motion Sickness of the Passenger, (3) Comfort of the Passenger, (4) Productivity assessment of the Passenger, and (5) Task Identification of the Passenger. These predictions and their mechanisms are described below.

Motion Sickness Susceptibility of the Passenger

This algorithm predicts a motion sickness susceptibility of the passenger. Motion sickness susceptibility is defined as the likelihood that a passenger will experience motion sickness for certain motion of the vehicle, and type of activity being performed by the passenger. In one possible embodiment we define 3 classes of motion sickness susceptibility—Class 1 are passengers with high likelihood for motion sickness, Class 2 are passengers with average likelihood of motion sickness, and Class 3 are passengers with low (lower than average) likelihood of motion sickness. Class 1 motion sickness susceptibility passengers are passengers who are more sensitive to stimuli (i.e. motion of vehicle, performing a productive task, etc.) that cause motion sickness—which means that they will likely experience motion sickness faster and/or at a higher intensity than an average passenger. Class 3 motion sickness susceptibility passengers are passengers who are less sensitive to stimuli that cause motion sickness—which means that they will likely experience motion sickness slower and/or at a lower intensity than an average passenger. Class 2 motion sickness susceptibility passengers are passengers who have an average sensitivity to motion sickness. The average motion sickness susceptibility can be determined through experiments, and user surveys. In other embodiments there can be more classes, or different classes defined to capture motion sickness susceptibility.

In one possible embodiment, a classification machine learning algorithm can be used to predict the motion sickness susceptibility of the passenger. Further, supervised or semi supervised algorithm training can be leveraged. Specific types of classification algorithms such as Neural Networks and/or Bayesian Classifiers can be used. For example, when using the Bayesian classifier for a given set of inputs to the algorithm (i.e. passenger gender, age, height, weight, self reported motion sickness susceptibility, physiological information such as heart rate and perspiration) the algorithm will attempt to predict the probability that the passenger falls into one of the classes defined for motion sickness susceptibility. In other embodiments Cluster analysis can be used to group passengers into a particular class of motion sickness susceptibility if they share the same attributes such as gender, age, height, and weight. In one embodiment, in addition to the algorithm being trained on experiment input data, the algorithm can also be trained on data it collects during the day to day operation of the PREACT system and data collected from the passenger.

The algorithm can accept quantitative inputs. Inputs such as age, weight, height, and user reported survey information that is quantitative can be used as is without any alteration. Inputs that are not inherently quantitative such as gender, qualitative responses to self reported surveys can first be translated into a quantitative value—for example, genders can be encoded using one-hot encoding or other equivalent quantitative encoding methods. In one embodiment, the algorithm will take passenger parameters such as height, age, weight, average heart rate, gender, and passenger self reported survey responses to questions about their past motion sickness experiences. The algorithm would have been trained on similar inputs.

Motion Sickness of the Passenger

The motion sickness state of the passenger is quantified and a motion sickness score is used to quantitatively represent the motion sickness of the passenger. This algorithm predicts a motion sickness score based on a set of passenger parameters and dynamic variables. The inputs to the model are the passenger physiological states, motion dynamics, visual-vestibular conflict level and profile. In one embodiment, the output is the motion sickness incidence (MSI) on a scale of zero to one hundred. MSI has been defined in the literature as the percentage of people that vomit under a given motion input frequency and magnitude applied for a given time interval. The algorithm is trained using previous datasets that include measurements of the aforementioned inputs along with the self-reported or calculated MSI. This allows for the correlation between inputs and predicted motion sickness score. In order to predict the output motion sickness score, supervised/semi-supervised regression machine learning algorithms can be used, such as linear regression, polynomial regression, ridge regression, principal component analysis, among others.

For instance, it is known that increased heart rate is positively correlated to motion sickness. Thus, it is expected that higher values for heart rate will yield higher motion sickness score. In order to understand the nature and intensity of such correlation, a prediction algorithm can be used. Given previously recorded heart rate and corresponding motion sickness score data, the algorithm can determine what is the best fit curve that allows for the determination of a motion sickness score given a heart rate value. This best fit can be achieved using the aforementioned regression algorithms. Evidently, motion sickness is not only a function of heart rate. Other parameters that are correlated to motion sickness include the experienced vestibular acceleration, the passenger susceptibility to motion sickness, cold sweating, among others. Thus, the prediction algorithm needs to account for these other variables, which can be done using multiple regression analysis.

Comfort of the Passenger

This algorithm predicts a passenger comfort score based on a set of passenger variables. This is similar to the motion sickness predictive algorithm in the sense that the output is a quantifiable continuous variable determined based on multiple input variables. In one embodiment, the passenger comfort score is a continuous variable proportional to a baseline comfort score of 100. The baseline comfort score is equivalent to the comfort experienced by a passenger in a stationary vehicle with no active systems. For example, a comfort score of 200 would mean that the passenger is twice as comfortable compared to a passenger in a stationary vehicle with no active systems.

The inputs to this algorithm include passenger self-reported comfort, passenger motion dynamics, passenger physiological states, passenger profile and cabin conditions. The algorithm is trained using previous datasets that include measurements of the aforementioned inputs along with the self-reported or calculated passenger comfort score. This allows for the correlation between inputs and predicted passenger comfort score. In order to predict the output comfort score, supervised/semi-supervised regression machine learning algorithms can be used, such as linear regression, polynomial regression, ridge regression, principal component analysis, among others.

For instance, it is known that passenger comfort as a function of cabin temperature has a global maximum value dependent on the passenger preference for temperature. Thus, it is expected that higher or lower temperature values than the passenger optimal temperature point will yield lower passenger comfort scores. In order to understand the nature and intensity of such correlation, a prediction algorithm can be used. Given previously recorded cabin temperatures and corresponding comfort score data, the algorithm can determine what is the best fit curve that allows for the determination of a passenger comfort score given a cabin temperature value. This best fit can be achieved using the aforementioned regression algorithms. Evidently, passenger comfort is not only a function of cabin temperature. Other parameters that are correlated to passenger comfort include the experienced head acceleration, heart rate, visual-vestibular conflict level, among others. Thus, the prediction algorithm needs to account for these other variables, which can be done using multiple regression analysis.

Productivity Assessment of Passenger

This algorithm predicts a passenger productivity score based on a set of passenger variables. This is similar to the motion sickness predictive algorithm in the sense that the output is a quantifiable continuous variable determined based on multiple input variables. In one embodiment, the productivity score is a continuous variable proportional to a baseline productivity score of 100. The baseline productivity score is equivalent to the productivity the passenger would have in a stationary vehicle with no active productivity systems. For instance, if the passenger takes twice as long to achieve the same task compared to a passenger in a stationary vehicle with no productivity active systems, the productivity score would be 50. Note that the active systems might enhance productivity, so scores above 100 are acceptable.

The inputs to this algorithm include passenger self-reported productivity, passenger physiological states, passenger motion dynamics, passenger profile, the identification of the task being performed and a quantifiable assessment of the task being performed. Examples of a quantifiable assessment of the task being performed includes words per minute in the case of a reading task, minutes spent in deep sleep in the case of a sleeping task, among others. The algorithm is trained using previous datasets that include measurements of the aforementioned inputs along with the self-reported or calculated passenger productivity score. This allows for the correlation between inputs and predicted passenger productivity score. In order to predict the output productivity score, supervised/semi-supervised regression machine learning algorithms can be used, such as linear regression, polynomial regression, ridge regression, principal component analysis, among others.

For instance, it is known that an increased amount of minutes spent in deep sleep is positively correlated to sleep productivity score (or sleep quality). Thus, it is expected that higher values for minutes spent in deep sleep will yield higher sleeping productivity scores. In order to understand the nature and intensity of such correlation, a prediction algorithm can be used. Given previously recorded minutes spent in deep sleep and corresponding sleep productivity data, the algorithm can determine what is the best fit curve that allows for the determination of a productivity score given a value for the number of minutes spent in deep sleep. This best fit can be achieved using the aforementioned regression algorithms. Evidently, sleep productivity is not only a function of minutes spent in deep sleep. Other parameters that are correlated to sleep productivity score include the total number of minutes spent sleeping, the frequency of movement during sleep, among others. Thus, the sleep productivity prediction algorithm needs to account for these other variables, which can be done using multiple regression analysis. It is important to note that productivity score will depend on the nature of the task being performed. The example given provides an insight into the sleep productivity assessment. However, other tasks will have different productivity scores associated with different input variables.

Task Identification of Passenger

This algorithm predicts the productive task being performed by the passenger in the vehicle. A productive task is defined as any activity that the passenger is engaged in such as reading, writing, typing, watching videos, video conferencing, or some combination thereof. In one possible embodiment we define 4 classes that capture the productive tasks of the passenger—Class 1 corresponds to reading a newspaper/paper document, Class 2 corresponds to writing on paper/tablet, Class 3 corresponds to typing on a keyboard/touchscreen, and Class 4 corresponds to watching a video on a screen (i.e. mobile phone, laptop, productivity display). These classes can be quantitatively codified using one hot encoding or an equivalent quantitative encoding method. These outputs are also referred to as Task ID.

The algorithm will receive inputs from various sensors in the vehicle such as video cameras, LiDAR, motion sensors, and can also receive direct inputs from the passenger. In one embodiment, the algorithm can receive inputs from one or more RGB color video cameras inside the vehicle, and from the user's self-reported task that they are performing. The information from the RGB color video camera is translated into a vast matrix that has numeric values corresponding to information in each pixel of the video/image. This matrix is the quantitative input to the algorithm. The user's self-reported task can be reported by pressing a button on a user interface and/or touchscreen within the vehicle. Once the user self reports the task, the algorithm can use the video information to verify this, and also label the video information for the purposes of training the algorithm for continuous improvement.

In one possible embodiment, a machine vision and classification machine learning algorithm can be used to predict the productive task being performed by the passenger in the vehicle. Further, supervised or semi supervised algorithm training can be leveraged. The algorithm can leverage space-time methods wherein an activity is represented by a set of space-time features or trajectories that can be extracted from the video information. For example, using the video information, the algorithm can determine the trajectory of the passenger's hand in space and time and use that to determine if the passenger is typing or writing. In one embodiment, in addition to the algorithm being trained on experiment input data, the algorithm can also be trained on data it collects during the day to day operation of the PREACT system and data collected from the passenger.

Generate PREACT Mechatronic Subsystem Commands Algorithms (28 in FIG. 6)

The Generate PREACT Mechatronic Subsystem Commands algorithms are further broken down into 3 algorithms. These algorithms are all for preemptive control—in that they generate preemptive commands and decisions using as inputs the real time and predicted states of the route & traffic, vehicle, PREACT mechatronic subsystem, and passenger. In addition to preemptive commands, they also use real time information to generate immediate current commands. In summary, the commands are generated over a time period, from the immediate to the future. The three preemption control algorithms are: (1) Vehicle Subsystem Commands for Motion Sickness Mitigation, (2) Vehicle Subsystem Commands for Comfort Enhancement, (3) Vehicle Subsystem Commands for Productivity Enhancement.

Vehicle Subsystem Commands for Motion Sickness Mitigation

This algorithm generates commands for the Vehicle Subsystems that help mitigate motion sickness of the passenger. These commands are preemptive as they use predictions of the future states of the passenger, and vehicle. These commands also include current, immediate commands to the vehicle subsystems. When combined, the commands generated at every instant of time include both current and preempted future commands. Each vehicle subsystem influences the passenger in a unique manner. In one possible embodiment, the algorithm can command and control the actions of the active seat, active restraint, active passenger stimuli, and active productivity interface. Each action of the vehicle subsystems can be defined as the output of the algorithm—tip and tilt of active seat, tension of active restraint, motion of active display (active productivity interface), and blinking of lights of active passenger stimuli. Each of those actions is quantified—tip and tilt of the active seat is defined by the angular position and velocity, tension of the active restraint is defined by the position of the restraint, motion of the active display is defined by the angular position. In one embodiment, the quantified outputs are captured in a matrix, with the rows corresponding to the actions defined above, and the columns corresponding to commands, with the first column corresponding to immediate/current actions, and the successive columns corresponding to preempted commands for the future. In other embodiments the outputs can be codified in other ways. In other embodiments other active/mechatronic vehicle subsystems can be commanded to mitigate motion sickness.

In one possible embodiment, a reinforcement machine learning algorithm can be used to generate the commands. Reinforcement machine learning leverages an exploration of various outcomes, then measures their influence as either positive or negative, and then exploits the outcomes with the most positive influence. For example, if the algorithm determines a tilt of 20 degree to account for the vehicle making an aggressive turn, and the passenger responds positively to this then the algorithm will continue to recommend this action over another for when the vehicle is making the same or similar turn again. In other embodiments, other algorithms and methods can be used to generate the commands.

In one possible embodiment, the predicted route and traffic (predicted based on historical data from the data center), the predicted vehicle chassis roll, and pitch (predicted vehicle states by the Vehicle model algorithm), the predicted passenger motion sickness susceptibility (predicted by the passenger model, and historical information from the data center), real time and predicted PREACT mechatronic subsystem states such as tip and tilt of active seat and tension in active restraint (predicted by the PREACT Mechatronic Subsystem model), and passenger self reported preference for vehicle subsystem commands as inputs to the algorithm. Most of these inputs are quantifiable, such as the vehicle chassis roll and pitch, passenger motion sickness susceptibility, and mechatronic subsystem states. The passenger self reported preference may or may not be quantitative, but this can be codified quantitatively. For example, in one possible embodiment the passenger may indicate that they would like "high" intervention of the active seat which corresponds to a tilt of 20 degree as opposed to "low" intervention of the active seat which corresponds to a tilt of 5 degree. Look up tables can be used to quantify the passenger self reported preferences. In other embodiments other inputs and methods to codify and quantify inputs and outputs can be used.

Vehicle Subsystem Commands for Productivity Enhancement

This algorithm generates commands for the Vehicle Subsystems that help enhance the productivity of the passenger. These commands are preemptive as they use predictions of the future states of the passenger, and vehicle. These commands also include real time, immediate commands to the vehicle subsystems. When combined, the commands generated at every instant of time include both real time and preempted future commands. Each vehicle subsystem influences the passenger's productivity in a unique manner. In one possible embodiment, the algorithm can command and control the actions of the active seat, active productivity interface, and the active cabin environment. Each action of the vehicle subsystems can be defined as the output of the algorithm—tip and tilt of active seat, motion of active display (active productivity interface), and brightness of lights of active cabin environment. Each of those actions is quantified—tip and tilt of the active seat is defined by the angular position and velocity, motion of the active display is defined by the angular position, and the brightness of the lights in the cabin. In one embodiment, the quantified outputs are captured in a matrix, with the rows corresponding to the actions defined above, and the columns corresponding to commands, with the first column corresponding to immediate/real time actions, and the successive columns corresponding to preempted commands for the future. In other embodiments the outputs can be codified in other ways. In other embodiments other active/mechatronic vehicle subsystems can be commanded to enhance passenger productivity.

In one possible embodiment, a reinforcement machine learning algorithm can be used to generate the commands. Reinforcement machine learning leverages an exploration of various outcomes, then measures their influence as either positive or negative, and then exploits the outcomes with the most positive influence. For example, if the algorithm determines that when a passenger is reading a book, to enhance productivity, the active seat tilts of 10 degree and the lighting in the cabin increases its brightness to enhance the productivity. The passenger can self report their productivity or this determination can be made using the cameras inside the cabin. In other embodiments, other algorithms and methods can be used to generate the commands.

In one possible embodiment, the predicted route and traffic (predicted based on historical data from the data center), the predicted vehicle chassis roll, and pitch (predicted vehicle states by the Vehicle model algorithm), the predicted passenger productivity assessment (predicted by the passenger model, and historical information from the data center), predicted Task ID, real time and predicted PREACT mechatronic subsystem states such as tip and tilt of active seat (predicted by the PREACT Mechatronic Subsystem model), and passenger self reported preference for vehicle subsystem commands as inputs to the algorithm. Most of these inputs are quantifiable, such as the vehicle chassis roll and pitch, and mechatronic subsystem states. The passenger self reported task ID, and productivity assessment can be quantified as described earlier. The passenger self reported productivity preference may or may not be quantitative, but this can be codified quantitatively. For example, in one possible embodiment the passenger may indicate that they would like "high" intervention of the active productivity interface which corresponds to a tilt of 10 degree of the display of the active productivity interface as opposed to "low" intervention of the display which corresponds to a tilt of 3 degree. Look up tables can be used to quantify the passenger self reported productivity preferences. In other embodiments other inputs and methods to codify and quantify inputs and outputs can be used.

Vehicle Subsystem Commands for Comfort Enhancement

This algorithm generates commands for the Vehicle Subsystems that help enhance the comfort of the passenger. These commands are preemptive as they use predictions of the future states of the passenger, and vehicle. These commands also include current, immediate commands to the vehicle subsystems. When combined, the commands generated at every instant of time include both current and preempted future commands. Each vehicle subsystem influences the passenger's comfort in a unique manner. In one possible embodiment, the algorithm can command and control the actions of the active seat, and the active cabin environment. Each action of the vehicle subsystems can be defined as the output of the algorithm—tip and tilt of active seat, brightness of lights of active cabin environment, and the air conditioning of active cabin environment. Each of those actions is quantified—tip and tilt of the active seat is defined by the angular position and velocity, brightness of the lights in the cabin, the temperature, direction, and speed of airflow of the air conditioning. In one embodiment, the quantified outputs are captured in a matrix, with the rows corresponding to the actions defined above, and the columns corresponding to commands, with the first column corresponding to immediate/current actions, and the successive columns corresponding to preempted commands for the future. In other embodiments the outputs can be codified in other ways. In other embodiments other active/mechatronic vehicle subsystems can be commanded to enhance passenger comfort.

In one possible embodiment, a reinforcement machine learning algorithm can be used to generate the commands. Reinforcement machine learning leverages an exploration of various outcomes, then measures their influence as either positive or negative, and then exploits the outcomes with the most positive influence. For example, if the algorithm determines that when a passenger is sleeping/resting, to enhance comfort, the lighting in the cabin decreases its brightness, and the temperature of the air is reduced (when it's hot outside, else increased when it's cold outside) to enhance the comfort. The passenger can self report their comfort or this determination can be made using the cameras inside the cabin. In other embodiments, other algorithms and methods can be used to generate the commands.

In one possible embodiment, the predicted route and traffic (predicted based on historical data from the data center), the predicted vehicle chassis roll, and pitch (predicted vehicle states by the Vehicle model algorithm), the predicted passenger comfort assessment (predicted by the passenger model, and historical information from the data center), real time and predicted PREACT mechatronic subsystem states such as tip and tilt of active seat (predicted by the PREACT Mechatronic Subsystem model), and passenger self reported preference for vehicle subsystem commands as inputs to the algorithm. Most of these inputs are quantifiable, such as the vehicle chassis roll and pitch, and mechatronic subsystem states. The passenger self reported comfort state, and comfort assessment can be quantified as described earlier. The passenger self reported comfort preferences may or may not be quantitative, but this can be codified quantitatively. For example, in one possible embodiment the passenger may indicate that they would like "more" comfort which corresponds to lower cabin temperatures and dimmer lights. Look up tables can be used to quantify the passenger self reported comfort preferences. In other embodiments other inputs and methods to codify and quantify inputs and outputs can be used.

Vehicle Algorithms

The Vehicle Driving Algorithm (FIG. 1 Block 8) consists of the Generate Route & Navigation (FIG. 2 Block 25), Generate Driving Actions Commands (26), and the Vehicle Model (27). These algorithms are prediction or preemptive control algorithms, and their embodiments are described in detail below. More specifically, the Predict Route & Navigation Algorithm (25) is a prediction algorithm, and the Generate Driving Actions Commands (26) is a preemptive control algorithms, and the Vehicle Model (27) is a prediction algorithm. While similar algorithms have been employed in the literature, the algorithms describe above differ in the inputs they use.

Generate Driving Actions that Improve Passenger States

The generation of driving actions is performed with the goal of minimizing passenger motion sickness, while maximizing passenger comfort and productivity. The algorithm also takes into account the fuel and energy consumption of the vehicle. The inputs to this algorithm are the historically aggregated driving action data, passenger motion sickness, passenger comfort, passenger productivity, passenger motion dynamics, passenger physiological states and passenger profile, as well as real-time route information, passenger states and passenger preferences. For instance, if the system generates a route with similar characteristics to a route that has caused motion sickness to a passenger with a similar profile to the current passenger, the algorithm might choose to select a different route in order to minimize motion sickness. In another example, if the generated route has high traffic during the time of the journey, the system might choose to select a different route to avoid multiple acceleration/breaking events and, consequently, minimize motion sickness.

Predict Optimum Routes that Improve Passenger States

The prediction of the route is performed with the goal of minimizing passenger motion sickness, while maximizing passenger comfort and productivity. The algorithm also takes into account the fuel and energy consumption of the vehicle. The inputs to this algorithm are the historically aggregated route information, passenger motion sickness, passenger comfort, passenger productivity, passenger motion dynamics, passenger physiological states and passenger profile, as well as the real-time route information, passenger states and passenger preferences. For instance, if the set of driving actions has high values of acceleration and the passenger profile indicates susceptibility to motion sickness, the system might choose to adopt a set of driving actions with lower acceleration values. In another example, if the set of driving actions includes multiple lane changes and the passenger is experiencing motion sickness, the algorithm might select an alternative set of driving actions with less lane changes to minimize motion sickness in the expense of increasing the time to reach the destination.

The techniques including algorithms, computation etc. described herein may be implemented by one or more computer programs executed by one or more computer processors. These one or more computer processors may be physically collocated (e.g. on-board vehicle, or remote data server) or may be distributed across multiple vehicles, remote data centers, remote servers, cloud servers, mobile computing devices, wearable computing devices, etc. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage. The algorithms, models, and computations described herein may be implemented in consolidated manner or a distributed manner. In the latter case, a certain portion of the algorithm or computation may be performed via a first computer program, and a different portion may be performed by a second computer program. However, the two computer programs, possibly running on separate computer processors, may work in conjunction and in communication to implement the said algorithm or computation.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A passenger state modulation system in a passenger vehicle, comprising:

an active seat for supporting a given passenger in the passenger vehicle;

a prediction algorithm executed by a computer processor and operable to predict motions of the passenger vehicle, where the predicted motions includes acceleration of the passenger vehicle; and a command generation algorithm executed by the computer processor and configured to receive the predicted motions of the passenger vehicle from the prediction algorithm, wherein the command generation algorithm is configured to receive real-time motion states of the passenger vehicle, where the received real-time motion states of the passenger vehicle include real-time acceleration of the passenger vehicle, wherein the command generation algorithm determines a preemptive command to tilt the active seat and issues the preemptive command to the active seat, where the active seat is tilted in same direction as the acceleration of the passenger vehicle, wherein the preemptive command is issued to the active productivity interface prior to the occurrence of a driving effect of the driving and steering command to the passenger vehicle.

2. The passenger state modulation system of claim 1 wherein the prediction algorithm predicts a state of the given passenger and motions of the passenger vehicle using machine learning method.

3. The passenger state modulation system of claim 1 wherein the prediction algorithm predicts a state of the given passenger and motions of the vehicle using data collected prior to current operation of the passenger vehicle and data collected in real time.

4. The passenger state modulation system of claim 1 wherein the prediction algorithm predicts motions of the vehicle using data describing the passenger vehicle, data describing route of the passenger vehicle and data describing traffic along the route of the passenger vehicle.

5. The passenger state modulation system of claim 1 wherein the prediction algorithm predicts a state of the given passenger using passenger information.

6. The passenger state modulation system of claim 1 wherein the state of the given passenger is selected from a group consisting of motion sickness, comfort level, productivity level, body motions and physiological condition.

7. The passenger state modulation system of claim 1 wherein the command generation algorithm determines a preemptive command to tilt the active seat using vehicle information and passenger information.

8. A passenger state modulation system in a passenger vehicle, comprising:

an active restraint residing in the passenger vehicle and configured to restrain a given passenger in the passenger vehicle;

a prediction algorithm executed by a computer processor and operable to predict motions of the passenger vehicle; and a command generation algorithm executed by the computer processor and configured to receive the predicted motions of the passenger vehicle from the prediction algorithm, wherein the command generation algorithm is configured to receive real-time motion states of the passenger vehicle, where the received real-time motion states of the passenger vehicle include real-time acceleration of the passenger vehicle, wherein the command generation algorithm determines a preemptive command for the active restraint and issues the preemptive command to the active restraint, wherein the command generation algorithm determines preemptive commands for the active restraint using historically aggregated information of the active restraint and historically aggregated passenger information, wherein the preemptive command is issued to the active restraint prior to the occurrence of a driving effect of the driving and steering command to the passenger vehicle.

9. The passenger state modulation system of claim 8 wherein the prediction algorithm predicts a state of the given passenger and motions of the passenger vehicle using machine learning method.

10. The passenger state modulation system of claim 8 wherein the prediction algorithm predicts a state of the given passenger and motions of the vehicle using data collected prior to current operation of the passenger vehicle and data collected in real time.

11. The passenger state modulation system of claim 8 wherein the prediction algorithm predicts motions of the vehicle using data describing the passenger vehicle, data describing route of the passenger vehicle and data describing traffic along the route of the passenger vehicle.

12. The passenger state modulation system of claim 8 wherein the prediction algorithm predicts a state of the given passenger using passenger information.

13. The passenger state modulation system of claim 12 wherein the state of the given passenger is selected from a group consisting of motion sickness, comfort level, productivity level, body motions and physiological condition.

14. The passenger state modulation system of claim 8 wherein the command generation algorithm determines a preemptive command for the active restraint using vehicle information and passenger information.

15. The passenger state modulation system of claim 8 wherein the command generation algorithm determines a preemptive command for the active restraint using states and parameters of the active restraint.

16. The passenger state modulation system of claim 8 wherein the active restraint is further defined as a strap attached to an actuator, such that the actuator can be controlled to vary the restraining force applied to given passenger by the strap.

17. A passenger state modulation system in a passenger vehicle, comprising:

an active productivity interface residing in the passenger vehicle and configured to support a task being performed by a given passenger while the vehicle is moving;

a prediction algorithm executed by a computer processor; and a command generation algorithm executed by the computer processor, wherein the command generation algorithm is configured to receive real-time motion states of the passenger vehicle, where the received real-time motion states of the passenger vehicle include real-time acceleration of the passenger vehicle, wherein the command generation algorithm determines a preemptive command for the active productivity interface and issues the preemptive command to the active productivity interface, wherein the command generation algorithm determines preemptive commands for the active productivity interface using historically aggregated information of the active productivity interface and historically aggregated passenger information, wherein the preemptive command is issued to the active productivity interface prior to the occurrence of a driving effect of the driving and steering command to the passenger vehicle.

18. The passenger state modulation system of claim 17 wherein the prediction algorithm predicts a state of the given passenger using machine learning method.

19. The passenger state modulation system of claim 17 wherein the prediction algorithm predicts a state of the given passenger using data collected prior to current operation of the passenger vehicle and data collected in real time.

20. The passenger state modulation system of claim 17 wherein the prediction algorithm predicts a state of the given passenger using passenger information.

21. The passenger state modulation system of claim 17 further comprises an imaging device arrange in the passenger vehicle and configured to capture image data of the given passenger, wherein the prediction algorithm determines a state of the given passenger in part based on the image data.

22. The passenger state modulation system of claim 17 further comprises a user input device configured to receive an input from a person in the vehicle, wherein the input indicates the productivity state of the given passenger and the prediction algorithm determines a state of the given passenger in part based on the input.

23. The passenger state modulation system of claim 17 wherein the active productivity interface is further defined as one of an active display, an active keyboard or an active work surface.

24. The passenger state modulation system of claim 1 wherein the prediction algorithm is operable to predict a state of the active seat, the prediction algorithm uses the preemptive command in the prediction of the state of the active seat, the prediction algorithm uses the predicted state of the active seat in a prediction of a state of the specific passenger, and the command generation algorithm is configured to receive the predicted state of the active seat.

25. The passenger state modulation system of claim 1 wherein the command generation algorithm determines preemptive commands to tilt the active seat using historically aggregated information of the active seat and historically aggregated passenger information.

26. The passenger state modulation system of claim 8 wherein the preemptive command is received by the prediction algorithm and is used in a prediction of a state of the specific passenger.

27. The passenger state modulation system of claim 26 wherein the prediction algorithm is operable to predict a state of the active restraint, the prediction algorithm uses the preemptive command in the prediction of the state of the active restraint, the prediction algorithm uses the predicted state of the active restraint in the prediction of the state of the specific passenger, and the command generation algorithm is configured to receive the predicted state of the active restraint.

28. The passenger state modulation system of claim 17 wherein the preemptive command is received by the prediction algorithm and is used in a prediction of a state of the specific passenger.

29. The passenger state modulation system of claim 28 wherein the prediction algorithm is operable to predict a state of the active productivity interface, the prediction algorithm uses the preemptive command in the prediction of the state of the active productivity interface, the prediction algorithm uses the predicted state of the active productivity interface in a prediction of a state of the specific passenger, and the command generation algorithm is configured to receive the predicted state of the active productivity interface.

* * * * *